United States Patent
Yamamura et al.

(10) Patent No.: US 9,419,279 B2
(45) Date of Patent: Aug. 16, 2016

(54) VANADIUM BATTERY

(75) Inventors: Tomoo Yamamura, Miyanagi (JP); Xiongwei Wu, Miyanagi (JP); Isamu Sato, Miyanagi (JP); Hiroki Sakuraba, Miyanagi (JP); Kenji Shirasaki, Miyanagi (JP); Suguru Ohta, Miyanagi (JP)

(73) Assignee: TOHOKU UNIVERSITY, Sendai-shi (JP)

( * ) Notice: Subject to any disclaimer, the term of this patent is extended or adjusted under 35 U.S.C. 154(b) by 1115 days.

(21) Appl. No.: 13/503,184

(22) PCT Filed: Oct. 20, 2010

(86) PCT No.: PCT/JP2010/068423
§ 371 (c)(1),
(2), (4) Date: Aug. 3, 2012

(87) PCT Pub. No.: WO2011/049103
PCT Pub. Date: Apr. 28, 2011

(65) Prior Publication Data
US 2012/0301787 A1    Nov. 29, 2012

(30) Foreign Application Priority Data

Oct. 20, 2009  (JP) .................................. 2009-241262
Jul. 29, 2010  (JP) .................................. 2010-170084

(51) Int. Cl.
*H01M 4/131* (2010.01)
*H01M 10/054* (2010.01)
(Continued)

(52) U.S. Cl.
CPC ............ *H01M 4/5825* (2013.01); *H01M 4/131* (2013.01); *H01M 10/054* (2013.01); *Y02E 60/122* (2013.01); *Y02P 70/54* (2015.11); *Y10T 29/49108* (2015.01)

(58) Field of Classification Search
None
See application file for complete search history.

(56) References Cited

U.S. PATENT DOCUMENTS

| 4,786,567 A | 11/1988 | Skyllas-Kazacos et al. |
| 2005/0287436 A1* | 12/2005 | Kawashige ........... H01M 8/188 429/189 |

(Continued)

FOREIGN PATENT DOCUMENTS

| AU | 2006261573 | 12/2006 |
| CN | 101192678 A | 6/2008 |

(Continued)

OTHER PUBLICATIONS

Notification of Reasons for Rejection dated Jun. 2, 2015, issued in counterpart Japanese Patent Application No. 2013-206004 (5 pages).

(Continued)

*Primary Examiner* — Maria J Laios
*Assistant Examiner* — Angela Martin
(74) *Attorney, Agent, or Firm* — Westerman, Hattori, Daniels & Adrian, LLP

(57) ABSTRACT

A solid vanadium rechargeable battery, including; a first vanadium compound containing vanadium, whose oxidation number changes between 2 and 3 due to oxidation and reduction reactions, or solid vanadium salt or complex salt including such vanadium, and a surface that becomes a negative electrode; a second vanadium compound containing vanadium, whose oxidation number changes between 5 and 4 due to reduction and oxidation reactions, or solid vanadium salt or complex salt including such vanadium, and a surface that becomes a positive electrode; and a separator sandwiched between the first and the second vanadium compounds for selectively allowing ions to pass through, is provided.

18 Claims, 19 Drawing Sheets

(51) Int. Cl.
  *H01M 4/58* (2010.01)
  *H01M 6/00* (2006.01)
  *H01M 4/583* (2010.01)

(56) References Cited

U.S. PATENT DOCUMENTS

| | | | |
|---|---|---|---|
| 2006/0183016 A1* | 8/2006 | Kazacos | B60L 11/1822 429/105 |
| 2008/0292964 A1 | 11/2008 | Kazacos et al. | |

FOREIGN PATENT DOCUMENTS

| | | | |
|---|---|---|---|
| JP | 2724817 | B2 | 3/1998 |
| JP | 11-011949 | A | 1/1999 |
| JP | 11-11949 | A | 1/1999 |
| JP | 2002-216833 | A | 8/2002 |
| JP | 2005-60155 | A | 3/2005 |
| JP | 2006-520520 | A | 9/2006 |
| JP | 2008-544444 | * | 12/2008 |
| JP | 2008-544444 | A | 12/2008 |
| WO | 99/65100 | A1 | 12/1999 |
| WO | 02/11227 | A1 | 2/2002 |
| WO | WO 02/11227 | * | 2/2002 |
| WO | 2006/135958 | A1 | 12/2006 |
| WO | WO 2006-135958 | * | 12/2006 |
| WO | 2009/151639 | A1 | 12/2009 |

OTHER PUBLICATIONS

Chinese 1st Office Action dated Feb. 21, 2014, issued in corresponding CN Patent Application No. 201080058340.X with English translation (15 pages).
Chinese 2nd Office Action dated Oct. 21, 2014, issued in corresponding CN Patent Application No. 201080058340.X with English translation (10 pages).
International Search Report of PCT/JP2010/068423, mailing date of Nov. 30, 2010.
Extended European Search Report dated May 7, 2013, issued in corresponding European Patent Application No. 10824952.5 (7 pages).
Chinese Office Action dated Feb. 21, 2014, issued in corresponding Chinese Patent Application No. 201080058340.X (9 pages).

* cited by examiner

VANADIUM BATTERY

TECHNICAL FIELD

The present invention relates to a solid-state electrolyte containing vanadium as an active material and a vanadium rechargeable battery using the same. In particular, the present invention relates to a vanadium-redox rechargeable battery using oxidation and reduction reactions of vanadium ions, vanadium salt, or vanadium complex salt.

BACKGROUND ART

Rechargeable battery have come into widespread use not only for digital household electrical appliances but also for motor-powered electric vehicles and hybrid vehicles.

A redox-flow battery, which performs charging/discharging based on the change in oxidation numbers, using two redox pairs that produce reduction-oxidation (redox) reaction in an electrolyte, with vanadium used as an active material, is known (Patent Reference 1).

In particular, a vanadium redox-flow battery, which includes +2 and +3 vanadium ions in oxidation states, namely $V^{2+}$ and $V^{3+}$, and +4 and +5 vanadium ions in oxidation state, namely $V^{4+}$ and $V^{5+}$, as redox pairs and supplies vanadium sulfuric acid solution stored in a tank to a flow type cell to cause charging and discharging, is used in the field of large power storage.

A redox-flow battery includes an positive electrolyte tank and a negative electrolyte tank respectively containing positive electrolyte, namely an active material on the positive electrode side, and negative electrolyte, namely an active material on the negative electrode side, and a stack for performing charging/discharging. The positive electrolyte and the negative electrolyte are transferred from the positive electrolyte tank and the negative electrolyte tank to the stack, and circulated. The stack has a structure where an ion-exchange membrane is sandwiched between the positive electrode and the negative electrode, and the following formulae represent the reactions that occur in the positive electrolyte and the negative electrolyte of the battery.

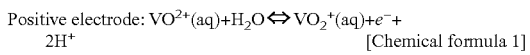
[Chemical formula 1]

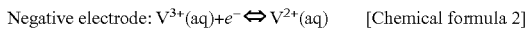
[Chemical formula 2]

In the above [Chemical formula 1] and [Chemical formula 2], "⇔" represents chemical equilibrium, and the suffix (aq) of ions indicates that the ions exist in the solution.

Since all the above reactions occur in sulfuric acid solutions, namely positive electrolyte and negative electrolyte, performance degradation due to generation of dendrite on the surface of electrodes does not occur at the time of charging, unlike lead battery using metal electrodes, and charging/discharging reactions can be repeated infinitely in principle.

In −zero charged state, namely the state where the positive electrolyte contains $V^{4+}$(aq) only and the negative electrolyte contains $V^{3+}$(aq) only, the open-circuit voltage of the battery is approximately 1.1 V.

When a sufficiently large voltage is applied between the positive electrode and the negative electrode using an external power supply to forcibly feed current to a vanadium redox-flow battery for charging, $V^{4+}$(aq) in the positive electrolyte is oxidized to $V^{5+}$(aq), and at the same time $V^{3+}$(aq) in the negative electrolyte is reduced to $V^{2+}$(aq). If charging is completed and 100% charged state is reached, the open-circuit voltage of the battery becomes approximately 1.58 V.

The capacity of vanadium redox-flow battery is determined based on the amount of vanadium dissolved in electrolyte. For example, in the case of a vanadium redox-flow battery containing two different electrolytes having given molar concentrations, the battery capacity is directly proportional to the volume of these two electrolytes. In other words, if the concentration of the positive electrolyte and the negative electrolyte is increased, and/or the volume of the positive electrolyte and the negative electrolyte is increased, the battery capacity increases. The volume of the positive electrolyte and the negative electrolyte can be increased by increasing the volume of the positive electrode tank and the negative electrode tank.

The energy density is an another specification, other than battery capacity, characterizing the performance of battery. Energy density is defined as the amount of energy (electric energy) that can be produced per unit weight of battery. For example, a lithium-ion rechargeable battery is a typical rechargeable battery that produces electric power using oxidation/reduction reactions that occur at electrodes. One of the reasons why lithium is used is that lithium is a light metal (atomic weight: 6.94), which is advantageous in achieving high energy density.

Since redox-flow battery uses solutions as electrolytes, their energy density is generally low. To improve this, a cerium-chromium redox gel battery is proposed (Patent Reference 2). This redox gel battery includes an inert anode; an inert cathode; a positive redox-gel electrolyte containing cerium chloride for example and contacting the inert anode; a negative redox-gel electrolyte containing chromium chloride for example and contacting the inert cathode; and a separator placed between the positive and negative redox-gel surfaces on the side opposite to the surfaces respectively contacting the anode and the cathode.

With this cerium-chromium redox-gel battery, the positive and negative gels are respectively made of $Ce^{4+}$ and $Cr^{2+}$ in charged state. In discharged state, the negative gel electrolyte $Cr^{2+}$ is oxidized to $Cr^{3+}$, whereas the positive gel electrolyte $Ce^{4+}$ is reduced to $Ce^{3+}$.

In addition, to obtain a compact and light-weight redox battery having high output performance compared to a redox-flow battery, in particular, an stationary-electrolyte-type redox battery is proposed (Patent Reference 3). The positive electrode electrolyte solution for the positive electrode and electrolyte solution tank for negative electrode of this stationary-electrolyte-type redox battery is filled with an electrolyte mixed with electrodes, namely a mixture of electrolyte and powder or small pieces of a conductive material.

More specifically, the stationary-electrolyte-type redox battery without an electrolyte storage tank is known including at least a separator; electrolyte tanks on the positive and negative electrode sides; bipolar plates on the positive and negative electrode sides; a metal plate having a positive electrode terminal, and a metal plate having a negative electrode terminal, wherein the electrolyte tanks on the positive and negative electrode sides are filled with a mixture of an electrolyte containing vanadium ions as an active material and a conductive material operating as electrodes, powder or small pieces of carbon for example.

PRIOR TECHNICAL REFERENCE

Patent Reference

Patent Reference 1: U.S. Pat. No. 4,786,567
Patent Reference 2: WO 99/65100
Patent Reference 3: JP 2002-216833 A

SUMMARY OF INVENTION

Problems to be Solved by the Invention

The conventional vanadium redox-flow battery uses liquids as positive electrolyte and negative electrolyte. Consequently, if the volume is increased to increase the battery capacity, the energy density decreases.

The cerium-chromium redox-gel battery invented to improve the low energy density of conventional vanadium redox-flow battery uses cerium, whose atomic weight, 140, is higher than the atomic weight of vanadium, 51, which made it disadvantageous to obtain high energy density.

With redox-flow and redox-gel battery using different active materials for positive electrolyte and negative electrolyte, they might be mutually contaminated, causing reduction in capacity, although they are separated from each other with an ion exchange membrane. In addition, a possible damage in the separator involves the risk of overheating and burning of the battery.

If the concentration of positive electrolyte and negative electrolyte of the battery is increased to increase energy density, solids are deposited with the progress of reduction-oxidation reactions, causing a problem of inhibiting proper function of the redox-flow battery, and furthermore, a trouble of the pump for circulating the positive electrolyte or negative electrolyte might occur.

With the stationary-electrolyte-type redox battery, which immobilizes the flow of electrolyte of conventional redox-flow battery, since the electrolyte still exists as a liquid, it is difficult to achieve a good balance between ensuring high energy density while maintaining high battery capacity and downsizing the battery. In addition, since the electrolyte does not exist apparently as a liquid, it was necessary to prepare the troubleshooting against leakage of liquid. Therefore, the assembly in the manufacturing process is not always easy.

Although attempts were made to create a redox battery that uses an identical active material for the positive electrode side and the negative electrode side but does not cause performance degradation due to generation of dendrite on the electrode surface at the time of charging and uses non-liquid electrolyte, such electrolyte has never been found.

Consequently, it is desired to provide a rechargeable battery using an identical active material for the positive electrode side and the negative electrode side and ensuring high energy density while maintaining high battery capacity, a solid-state electrolyte to be used for such a rechargeable battery, and a solid-state active material that can be used in such an electrolyte.

Means for Solving the Problems

To achieve one of the above objectives, the vanadium battery according to an embodiment of the present invention is characterized in that it includes: a first vanadium compound containing vanadium, whose oxidation number changes between 2 and 3 due to oxidation and reduction reactions, or solid vanadium salt or complex salt including such vanadium, and a surface that becomes i.e. composes of a negative electrode; a second vanadium compound containing vanadium, whose oxidation number changes between 5 and 4 due to reduction and oxidation reactions, or solid vanadium salt or complex salt including such vanadium, and a surface that becomes i.e. composes of a positive electrode; and a separator sandwiched between the first and the second vanadium compounds for selectively allowing ions to pass through.

To achieve one of the above objectives, the vanadium battery according to an embodiments of the present invention is characterized in that it includes: a first vanadium compound containing vanadium, whose oxidation number changes between 2 and 3 due to oxidation and reduction reactions, or solid vanadium salt or complex salt including such vanadium; a second vanadium compound containing vanadium, whose oxidation number changes between 5 and 4 due to reduction and oxidation reactions, or solid vanadium salt or complex salt including such vanadium; a separator sandwiched between the first and the second vanadium compounds for selectively allowing ions to pass through; a negative electrode connected to the first vanadium compound; and a positive electrode connected to the second vanadium compound.

To solve the problem described above, a method of manufacturing a solid-state active material used for a vanadium redox battery according to the present invention is characterized in that it includes at least one of the following steps: a step of preparing a solution containing tetravalent vanadium ions or cations containing vanadium in tetravalent state; a step of drying the solution having undergone electrolytic reduction under reduced pressure to obtain a solid active material; a step of performing electrolytic reduction or electrolytic oxidation of the solution containing tetravalent vanadium ions or cations containing vanadium in tetravalent state; a step of placing the solution in an environment including oxygen; and a step of drying supernatant and deposits.

MODES FOR CARRYING OUT THE INVENTION

Overall Description of the Invention

Figure 1:
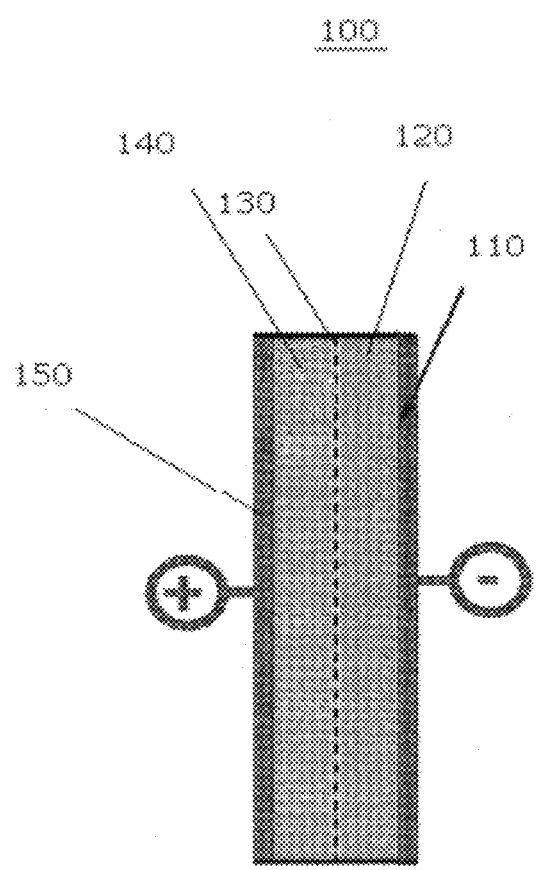
FIG. 1 is a schematic diagram of a solid vanadium redox rechargeable battery according to the present invention.

To achieve one of the above objectives, the vanadium battery according to an embodiments of the present invention is characterized in that it includes: a first vanadium compound containing vanadium, whose oxidation number changes between 2 and 3 due to oxidation and reduction reactions, or solid vanadium salt or complex salt including such vanadium, and a surface that becomes a negative electrode; a second vanadium compound containing vanadium, whose oxidation number changes between 5 and 4 due to reduction and oxidation reactions, or solid vanadium salt or complex salt including such vanadium, and a surface that becomes an positive electrode; and a separator sandwiched between the first and the second vanadium compounds for selectively allowing ions to pass through.

The vanadium battery according to the present invention both includes redox pairs containing vanadium. Vanadium can be in several oxidation states including divalence, trivalence, tetravalence, and pentavalence, and in addition, is a light element having electric potential of a degree useful for battery. With the vanadium battery according to the present invention, since vanadium, which is an active material, is contained in a first and a second vanadium compounds containing solid vanadium salt or complex salt, there is no need to worry about liquid leakage, and a redox rechargeable battery ensuring high security and high energy density can be obtained.

In addition, by increasing the density of vanadium in the first and the second vanadium compounds, large battery capacity can be obtained.

The first vanadium compound in this embodiment contains a surface that becomes i.e. coposes of a negative electrode, and the second vanadium compound contain a surface that becomes a positive electrode. The first and the second vanadium compounds may contain not only an active material but also carbon. And the first and the second vanadium compounds function as electrolytes. As a material containing carbon, those having high electric conductivity and high flow rate at the same time, such as carbon felt commercially available as the product name of XF30ADP14, are preferable.

As a result, an electrolyte containing solid-state active material and electrodes can be integrated into one, and this integration reduces the travel distance of the active material within the first and the second vanadium compounds in the process of diffusion at the time of charging/discharging.

In this case, as "vanadium whose oxidation number changes between 2 and 3 or solid vanadium salt or complex salt containing such vanadium," vanadium(II) sulfate n-hydrate, vanadium(III) sulfate n-hydrate, etc. are available.

As "a first vanadium compound containing vanadium whose oxidation number changes between 2 and 3 due to oxidation and reduction reactions or solid vanadium salt or complex salt containing such vanadium," above vanadium(II) sulfate n-hydrate, vanadium(III) sulfate n-hydrate, or mixture of both, to which a sulfuric acid solution is added, are available. Such vanadium compounds have the function of electrolytes containing active materials.

It is desirable that the first vanadium compound have hardness or viscosity of a degree allowing it to remain a solid, but may be in a state of solid, non-solid, or state of coexistence of both depending on the state of battery.

As "vanadium whose oxidation number changes between 5 and 4 due to reduction and oxidation reactions or solid vanadium salt or complex salt containing such vanadium," vanadium oxysulfate n-hydrate, vanadium dioxysulfate n-hydrate, etc. are available.

As "a second vanadium compound containing vanadium whose oxidation number changes between 5 and 4 due to reduction and oxidation reactions or solid vanadium slat or complex salt containing such vanadium," above vanadium oxysulfate, vanadium dioxysulfate, and a mixture of both, to which a sulfuric acid solution is added, are available. Such vanadium compounds have the function of electrolytes containing active materials.

It is desirable that the second vanadium compound has hardness or viscosity of a degree allowing it to remain a solid, but may be in a state of solid, non-solid, or state of coexistence of both depending on the state of battery.

The separator includes an ion exchange membrane.

As a separator, ion exchange membranes such as Selemion APS (registered trademark) and Nafion 177 (registered trademark) are available. However, as the separator, not only these ion exchange membranes but also those that can selectively allow given ions to pass through can be used. Ions that can be selectively made to pass through ionic membrane can contain protons. In particular, cationic membranes having high ion exchange capacity, high permanent selectivity, and high resistivity are desirable. The ion exchange membrane sold as the product name of Neosepta (registered trademark) CMX C-1000 is available.

The first vanadium compound connected to the positive electrode, and the second vanadium compound connected to the negative electrode, of the vanadium battery according to this embodiment include chemical reactions given by the following formulae.

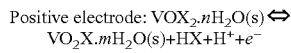

Positive electrode: $VOX_2 \cdot nH_2O(s) \Leftrightarrow$
$VO_2X \cdot mH_2O(s) + HX + H^+ + e^-$ [Chemical formula 3]

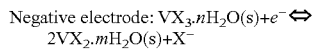

Negative electrode: $VX_3 \cdot nH_2O(s) + e^- \Leftrightarrow$
$2VX_2 \cdot mH_2O(s) + X^-$ [Chemical formula 4]

In the chemical formulae 3 and 4 as shown above, X represents monovalent anion. However, even if X represents anion having valence of m, [Chemical formula 3] and [Chemical formula 4] may be interpreted with coupling coefficient (1/m) taken into consideration. Also, "$\Leftrightarrow$" represents equilibrium. Since Chemical formula 3 and Chemical formula 4 are formulae representing chemical reactions, equilibrium means the state where the amount of change of the product of reversible reaction coincides with the amount of change of the starting material.

In [Chemical formula 3] and [Chemical formula 4] as shown above, and in the subsequent chemical reaction formulae and substance names, "n" represents that it can take various values. For example, vanadium(IV) oxysulfate n-hydrate and vanadium(V) dioxysulfate n-hydrate do not necessarily have the same number of water of hydration.

In [Chemical formula 3] and [Chemical formula 4] as shown above, and in the subsequent chemical formulae, when the value of n on both sides can change as a result of chemical reaction, different characters are used for both sides. For example, [Chemical formula 3] represents such a case. When n is considered not to change even in the process of chemical change, identical character n is used. [Chemical formula 7] as shown below represents such a case.

By allowing the first vanadium compound and the second vanadium compound to contact each other, and externally applying voltage, oxidation and reduction reactions respectively progress in each, and thereby the battery is charged.

In addition, by connecting an electrical load between the positive electrode and the negative electrode, reduction and oxidation reactions respectively progress in each, and thereby the battery is discharged.

In this way, using vanadium, which is the lightest substance having redox pairs, and by causing redox reactions of solid vanadium salt or vanadium complex salt, a high energy density can be achieved. Furthermore, by using the vanadium salt or vanadium complex salt in a solid state, a high battery capacity can be obtained. Consequently, a vanadium solid rechargeable battery having high battery capacity and high energy density can be obtained.

With the vanadium battery according to this embodiment, solid vanadium salt or complex salt that changes between the divalence, and trivalence forms one redox pair, whereas solid vanadium salt or complex salt that changes between pentavalence and tetravalence forms another redox pair. Consequently, the safety of vanadium battery can be ensured while large electromotive force is maintained.

With the vanadium battery having such a structure, since generation of dendrite can be suppressed, a rechargeable battery having excellent durability can be obtained.

Moreover, it is possible to prepare a vanadium compound containing vanadium having arbitrary oxidation number of 2 (divalence) to 5 (pentavalence).

Thus, not only the solid vanadium redox rechargeable battery having charging state of 0% in the initial state but also the one having charging state of 100% can be manufactured.

To achieve one of the objectives described above, the vanadium battery according to the embodiment of the present invention is characterized in that it includes: a first vanadium compound containing vanadium, whose oxidation number changes between 2 and 3 due to oxidation and reduction reactions, or solid vanadium salt or complex salt containing such vanadium; a second vanadium compound containing vanadium, whose oxidation number changes between 5 and 4 due to reduction and oxidation reactions, or solid vanadium salt or complex salt containing such vanadium; a separator sandwiched between the first and the second vanadium compounds and selectively allowing ions to pass through; a negative electrode connected to the first vanadium compound, and a positive electrode connected to the second vanadium compound.

The vanadium battery according this embodiment includes a positive electrode and a negative electrode, in addition to the first and the second vanadium compounds.

As "the first compound containing vanadium, whose oxidation number changes between 2 and 3 due to oxidation and reduction reactions, or solid vanadium salt or complex salt containing such vanadium," vanadium(II) sulfate n-hydrate, vanadium(III) sulfate n-hydrate, etc. to which silica is added to make them in gel state may be used. In this case, "the first vanadium compound" may have hardness or viscosity of a degree allowing it to remain a solid. Such vanadium compound has the function of a solid-state electrolyte containing active material. Consequently, in this case, solid-state electrolyte containing active material necessary for achieving solid vanadium battery can be obtained.

As "the second compound containing vanadium, whose oxidation number changes between 5 and 4 due to reduction and oxidation reactions, or solid vanadium salt or complex salt containing such vanadium," vanadium oxysulfate n-hydrate, vanadium dioxysulfate n-hydrate, etc. to which silica is added to make them in gel state may be used. In this case, "the second vanadium compound" may have hardness or viscosity of a degree allowing it to remain a solid. Such vanadium compound has the function of a solid-state electrolyte containing active material. Consequently, in this case, solid-state electrolyte containing active material necessary for achieving solid vanadium battery can be obtained.

With the vanadium battery according to this embodiment, similar function effect as the vanadium battery according to the embodiment described above can be obtained.

To achieve one of the objectives described above, the vanadium battery according to another embodiment of the present invention is characterized in that it includes: a first vanadium mixture having a surface that becomes a negative electrode and containing vanadium, whose oxidation number changes between 2 and 3 due to oxidation and reduction reactions, or solid vanadium salt or complex salt including such vanadium; and a second vanadium mixture having a surface that becomes a positive electrode and containing vanadium, whose oxidation number changes between 5 and 4 due to reduction and oxidation reactions, or solid vanadium salt or complex salt including such vanadium.

Here, "the first vanadium mixture" and "the second vanadium mixture" are preferably solid or slurry. The "solid" in this case includes gel, etc. having high viscosity.

"Mixture" may generally include a mixture of two or more compounds, or elements, namely pure materials.

As the gel described above, sulfate gel is available. In this case, "the first vanadium mixture" is a sulfate gel containing vanadium sulfate or solid powder of vanadyl sulfate.

With the vanadium battery in this embodiment, functional effect equivalent to that of the vanadium battery according to the embodiment described above can be obtained.

When the first and the second vanadium mixtures are slurry, electrical resistance can be decreased, which suppresses heating of the battery.

In this embodiment, the first and the second vanadium mixtures respectively include surfaces that become the negative electrode and the positive electrode. The negative electrode and the positive electrode may be provided as components different from the first and the second vanadium mixtures.

The vanadium battery according to another embodiment of the present invention may include that sulfuric acid moistens into the first and the second vanadium compounds, and ions that can be made to pass through the separator such as hydrogen ions, sulfate ions, hydrogen sulfate ions, etc. are available.

With the vanadium battery according to this embodiment, it is desirable that sulfuric acid moistens into "the first and the second vanadium mixtures". And in this case, in the first and the second vanadium mixtures, chemical reactions given by the following chemical formulae occur.

$$2VOSO_4 \cdot nH_2O(s) \Leftrightarrow (VO_2)_2SO_4 \cdot mH_2O(s) + SO_4^{2-} + 4H^+ + 2e^- \quad \text{[Chemical formula 5]}$$

$$V_2(SO_4)_3 \cdot nH_2O(s) + 2e^- \Leftrightarrow 2VSO_4 \cdot mH_2O(s) + SO_4^{2-} \quad \text{[Chemical formula 6]}$$

In the above [Chemical formula 5] and [Chemical formula 6], vanadyl sulfate n-hydrate and vanadium sulfate n-hydrate react in solid state.

Also with the vanadium battery according to this embodiment, the functionional effect equivalent to the vanadium battery according to the embodiment described above can be obtained.

The vanadium battery according to still another embodiment of the present invention is characterized in that the solid vanadium salt or complex salt contained in the first vanadium compound or mixture is solid powder of vanadium(III) sulfate n-hydrate, the solid vanadium salt or complex salt contained in the second vanadium compound or mixture is solid powder of vanadyl(IV) sulfate n-hydrate, and sulfuric acid moistens into the first and the second vanadium compounds or mixtures.

In other words, with the vanadium battery according to this embodiment, as the solid vanadium salt or complex salt contained in the first vanadium compound or mixture connected to the negative electrode, solid powder of vanadium(III) sulfate n-hydrate is used. And, as the solid vanadium salt or complex salt contained in the second vanadium compound or mixture connected to the positive electrode, solid powder of vanadyl(IV) sulfate n-hydrate is used.

And a sulfuric acid solution is added to the solid powder of vanadium(III) sulfate n-hydrate and solid powder of vanadyl (IV) sulfate n-hydrate to a degree "allowing the sulfuric acid to moisten into the first and the second vanadium compounds or mixtures." The first and the second vanadium compounds or mixtures to which sulfuric acid is added can have the hardness allowing it to be a solid, or can be slurry. Such vanadium compounds or mixtures have the function of solid-state salt (solid-state electrolyte) containing active material. In this case, solid-state salt containing active material necessary to achieve a solid vanadium battery can be obtained.

The vanadium battery thus structured is in a state of charging of 0% immediately after the manufacture.

In the electrolyte containing solid active material on the positive electrode side of the vanadium battery according to this embodiment, the following reactions occur.

$$VOSO_4 \cdot nH_2O(s) \Leftrightarrow VOSO_4 \cdot nH_2O(aq) \Leftrightarrow VOSO_4(aq) + nH_2O(aq) \quad \text{[Chemical formula 7]}$$

$$(VO_2)_2SO_4 \cdot nH_2O(s) \Leftrightarrow (VO_2)_2SO_4 \cdot nH_2O(aq) \Leftrightarrow (VO_2)_2SO_4(aq) + nH_2O(aq) \quad \text{[Chemical formula 8]}$$

$$VO^{2+}(aq) + VO_2^+(aq) \Leftrightarrow V_2O_3^{3+}(aq) \quad \text{[Chemical formula 9]}$$

$$VO^{2+}(aq) + SO_4^{2-}(aq) \Leftrightarrow VOSO_4(aq) \quad \text{[Chemical formula 10]}$$

$$2VO^{2+}(aq) + SO_4^{2-}(aq) \Leftrightarrow (VO_2)_2SO_4(aq) \quad \text{[Chemical formula 11]}$$

Meanwhile, the following reactions occur in the solid active material on the negative electrode side of the battery.

$$V_2(SO_4)_3 \cdot nH_2O(s) \Leftrightarrow V_2(SO_4)_3 \cdot nH_2O(aq) \Leftrightarrow V_2(SO_4)_3 + nH_2O(aq) \quad \text{[Chemical formula 12]}$$

$$VSO_4 \cdot nH_2O(s) \Leftrightarrow VSO_4 \cdot nH_2O(aq) \Leftrightarrow VSO_4(aq) + nH_2O(aq) \quad \text{[chemical formula 13]}$$

$$2V^{3+}(aq) + 3SO_4^{2-} \Leftrightarrow V_2(SO_4)_3(aq) \quad \text{[Chemical formula 14]}$$

When a vanadium battery in 0% charged state is manufactured using solid powder of vanadium(III) sulfate n-hydrate as solid vanadium salt or complex salt contained in the first vanadium compound, which is connected to the negative electrode, and vanadyl(IV) sulfate n-hydrate as solid vanadium salt or complex salt contained in the second vanadium compound, which is connected to the positive electrode, following chemical actions are occurred. $VO^{2+}(aq)$ that appears in [Chemical formula 1] is generated from $VO_2SO_4(aq)$ that is generated by the chemical reaction given by [Chemical formula 7] in particular among the reactions that occur in the second vanadium compound given by [Chemical formula 7] to [Chemical formula 11].

In addition, of the reactions that occur in the first vanadium compound given by [Chemical formula 12] to [Chemical formula 14], $V^{3+}(aq)$ that appears in [Chemical formula 2] is generated from $V_2(SO_4)_3$ that is generated by the chemical reaction expressed by [Chemical formula 12], in particular.

When a sufficiently high voltage is then applied between the positive electrode and the negative electrode of the vanadium battery in 0% charged state structured as described above, $VO^{2+}(aq)$ in the positive electrolyte is oxidized to $VO_2^+(aq)$, $V^{3+}(aq)$ in the negative electrolyte is reduced to $V^{2+}(aq)$ at the same time, and thus the battery is charged. When the electrical load is connected between the positive electrode and the negative electrode after charging is completed, reaction occurs in the direction reverse to charging, and thus the battery is discharged.

In this embodiment, since sulfuric acid to be added is of an amount "allowing it to moisten into the first and the second vanadium compounds," the reactions given by [Chemical formula 7] and [Chemical formula 12] do not progress until the solid powder of vanadium(III) sulfate.n-hydrate, namely the first vanadium compound, and vanadyl(IV) sulfate n-hydrate, namely the second vanadium compound, turn into liquid completely. In other words, the first and the second vanadium compounds are regarded as solid-state electrolytes containing active material.

Consequently, the vanadium battery according to this embodiment is a solid vanadium redox battery producing the effect equivalent to the vanadium battery according to the embodiment described above.

The method of manufacturing a solid active material used for the vanadium redox battery according to another embodiment of the present invention is characterized in that it has a step of preparing a solution containing tetravalent vanadium ions or cations including vanadium in tetravalent state, and a step of drying the solution to obtain a solid active material.

In this case, as "tetravalent vanadium ions or cations including vanadium in tetravalent state," $V^{4+}$ and $VO^{2+}$ are available.

As a "solution containing tetravalent vanadium ions or cations including vanadium in tetravalent state," vanadium oxysulfate solution is available.

The "solid active material used for vanadium redox battery" includes vanadium(III) sulfate n-hydrate and vanadyl (IV) sulfate n-hydrate.

According to the method of manufacturing the solid active material in accordance with this embodiment, the solid active material containing vanadium in tetravalent oxidation state can be obtained. In addition, by using this solid active material as redox pairs, a solid vanadium redox battery can be obtained.

The method of manufacturing a solid active material used for vanadium redox battery according to another embodiment of the present invention is characterized in that it includes: a step of preparing a solution containing tetravalent vanadium ions or cations including vanadium in tetravalent state; a step of performing electrolytic reduction of the solution containing tetravalent vanadium ions or cations including vanadium in tetravalent state; and a step of drying the solution to obtain a solid active material.

In the step of "performing electrolytic reduction of the solution containing tetravalent vanadium ions or cations including vanadium in tetravalent state," electrolytic reduction may be performed while noble gas bubbling is conducted.

Furthermore, electrolytic reduction may be performed while the liquid temperature is maintained at a constant level. The constant temperature may be a certain temperature falling within a range from 10° C. to 30° C.

As a gas used for bubbling, argon is available.

Electrolytic reduction may be constant-current electrolytic reduction.

With subjecting electrolytic reduction of tetravalent vanadium ions or cations containing vanadium in tetravalent state, a solution containing divalent vanadium ions or cations including vanadium in divalent oxidation state can be obtained by performing −1 A constant-current electrolytic reduction for five hours for example.

That the oxidation number has changed from 4 to 2 can be checked easily by the change in color of the solution from blue to purple.

According to the method of manufacturing a solid active material in accordance with this embodiment, the solid active material containing vanadium in divalent oxidation state can be obtained. Furthermore, by using this solid active material as redox pairs, a solid vanadium redox battery can be obtained.

The method of manufacturing a solid active material used for the vanadium redox battery according to still another embodiment of the present invention is characterized in that it includes: a step of preparing a solution containing tetravalent vanadium ions or cations including vanadium in tetravalent state; a step of subjecting the solution containing tetravalent vanadium ions or cations including vanadium in tetravalent state to electrolytic reduction; a step of placing the solution in an environment including oxygen; and a step of drying the solution to obtain a solid active material.

In this case, the "environment including oxygen" may be air.

For example, 1 A constant-current electrolytic reduction is performed for five hours, and after checking that the color of the solution has changed from blue to purple completely, the solution is left in the air for twelve hours. As a result, a solution containing trivalent vanadium ions or cations including vanadium in trivalent state can be obtained. The color of this solution is green. By drying the solution thus prepared under decreased pressure, a solid active material containing vanadium in trivalent oxidation state can be obtained. Furthermore, by using this solid active material as redox pairs, a solid vanadium redox battery can be obtained.

The method of manufacturing a solid active material used for the vanadium redox battery according to another embodiment of the present invention is characterized in that it includes: a step of preparing a solution containing tetravalent vanadium ions or cations including vanadium in tetravalent oxidation state; a step of performing electrolytic oxidation of the solution containing tetravalent vanadium ions or cations including vanadium in tetravalent oxidation state; a step of drying supernatant and deposits; and a step of further drying the dried solution under reduced pressure to obtain a solid active material.

For example, 1 A constant-current electrolytic reduction is performed for two and a half hours, and after checking that the color of the solution has changed from blue to yellow completely, the solution is left in the air for twelve hours. As a result, a solution containing pentavalent vanadium ions or cations including vanadium in pentavalent state can be obtained.

By drying this solution, a solid active material containing pentavalent vanadium ions or vanadium in pentavalent state can be obtained.

For example, by using an electrolyte containing a solid active material including vanadium in tetravalent oxidation state and that containing vanadium in trivalent oxidation state are used as redox pairs, a solid vanadium rechargeable battery having high battery capacity and high energy density, and in 0% charged state immediately after manufacturing, can be obtained.

When a solid active material containing vanadium in pentavalent oxidation state and that containing vanadium in divalent oxidation state are used as redox pairs, a solid vanadium rechargeable battery having high battery capacity and high energy density, and in 100% charged state immediately after manufacturing, can be obtained.

Furthermore, a solid vanadium battery can be obtained by manufacturing a solid-state salt (solid-state electrolyte) containing an active material which includes an vanadium ions in valence of n or vanadium in a state of valence of n, wherein n is an integer from 2 to 5, obtained by the method described above.

The vanadium battery according to still another embodiment of the present invention is characterized in that it includes: a first solid vanadium compound or mixture supported on the surface of a conductive material and formed with vanadium, whose oxidation number changes between 2 and 3 due to oxidation and reduction reactions, or vanadium salt or complex salt containing such vanadium; a second solid vanadium compound or mixture supported on the surface of a conductive material and formed with vanadium, whose oxidation number changes between 5 and 4 due to reduction and oxidation reactions, or vanadium salt or complex salt containing such vanadium; a separator sandwiched between the first and the second vanadium compounds selectively passing through ions; a negative electrode connected to the first vanadium compound; and a positive electrode connected to the second vanadium compound.

In this case, "with solid vanadium salt or complex salt supported on the surface of a conductive material" represents a state wherein by immersing the conductive material in a vanadium solution containing vanadium salt or complex salt and drying it in vacuum, the solid vanadium salt or complex salt is attaching to the surface of the conductive material. The vanadium battery fabricated in this way using the first and the second vanadium compounds wherein solid vanadium salt or complex salt are supported on the surface of a conductive material is the all-solid vanadium redox battery.

"Conductive material" may be the same material as the one that forms the positive electrode and the negative electrode.

The solid vanadium redox rechargeable battery fabricated in this way can ensure high energy density while maintaining high battery capacity, and at the same time downsizing is allowed. Since the electrolyte exists in liquid state, there is no need to take measures against leakage, and thus easy assembly in the manufacturing process is ensured.

The vanadium battery according to another embodiment of the present invention is characterized in that the conductive material is carbon.

In this case, "carbon" may be in a form of felt (carbon felt), knitted carbon fabric, carbon texture, etc.

The solid first and/or second vanadium compounds or mixtures formed with vanadium salt or complex salt containing vanadium supported on the surface of a conductive material may contain sulfate salt, chloride, or fluoride as counter ions against vanadium salt or complex salt.

For example, when chloride is contained as counter ions, the following reactions occur in the electrolyte containing the solid active material on the positive electrode side.

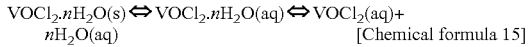
$VOCl_2 \cdot nH_2O(s) \Leftrightarrow VOCl_2 \cdot nH_2O(aq) \Leftrightarrow VOCl_2(aq) + nH_2O(aq)$ [Chemical formula 15]

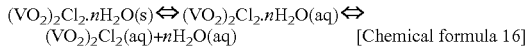
$(VO_2)_2Cl_2 \cdot nH_2O(s) \Leftrightarrow (VO_2)_2Cl_2 \cdot nH_2O(aq) \Leftrightarrow (VO_2)_2Cl_2(aq) + nH_2O(aq)$ [Chemical formula 16]

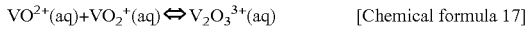
$VO^{2+}(aq) + VO_2^+(aq) \Leftrightarrow V_2O_3^{3+}(aq)$ [Chemical formula 17]

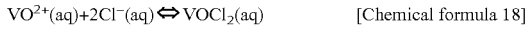
$VO^{2+}(aq) + 2Cl^-(aq) \Leftrightarrow VOCl_2(aq)$ [Chemical formula 18]

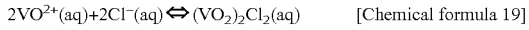
$2VO^{2+}(aq) + 2Cl^-(aq) \Leftrightarrow (VO_2)_2Cl_2(aq)$ [Chemical formula 19]

Meanwhile, in the electrolyte containing the solid active material on the negative electrode side of the battery, the following reactions occur.

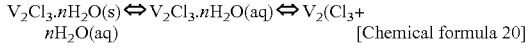
$V_2Cl_3 \cdot nH_2O(s) \Leftrightarrow V_2Cl_3 \cdot nH_2O(aq) \Leftrightarrow V_2Cl_3 + nH_2O(aq)$ [Chemical formula 20]

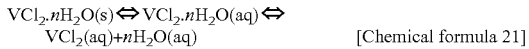
$VCl_2 \cdot nH_2O(s) \Leftrightarrow VCl_2 \cdot nH_2O(aq) \Leftrightarrow VCl_2(aq) + nH_2O(aq)$ [Chemical formula 21]

$2V^{3+}(aq) + 6Cl^- \Leftrightarrow V_2Cl_3(aq)$ [Chemical formula 22]

When fluoride is used as counter ions, it is only necessary to replace Cl in [Chemical formula 15] to [Chemical formula 22] with F.

The solid vanadium redox rechargeable battery structured in this way has high energy density while maintaining high battery capacity, and high security is ensured. In particular, when the sulfate salt is used as counter ions, and the battery is operated at the current density of 5 mA/cm² and cutoff voltage of 0.7 V. Then, the output voltage of 1.5 V and the energy density per weight of 70 Wh/kg can be achieved.

Furthermore, since stable energy efficiency can be obtained over a relatively large range of the active material on the positive electrode side and the active material on the negative electrode side, rechargeable battery appropriate as consumer products can be obtained.

The method of manufacturing a solid-state vanadium compound or mixture that functions as a solid electrolyte used for a rechargeable battery containing vanadium, whose oxidation number changes, or vanadium salt or complex salt containing such vanadium according to the present invention is characterized in that it includes a step of supporting the vanadium or vanadium salt or complex salt containing such vanadium on the surface of a conductive material by immersing a conductive material in a solution containing the vanadium or vanadium salt or complex salt containing such vanadium and sulfate ions, chlorine ions, or fluorine ions as counter ions against the vanadium salt or complex salt, and drying them in vacuum.

By manufacturing the solid electrolyte in this way, a solid vanadium redox rechargeable battery containing: a first solid vanadium compound or mixture supported on the surface of a conductive material and formed with vanadium, whose oxidation number changes between 2 and 3 due to oxidation and reduction reactions, or vanadium salt or complex salt containing such vanadium; a second solid vanadium compound or mixture supported on the surface of a conductive material and formed with vanadium, whose oxidation number changes between 5 and 4 due to reduction and oxidation reactions, or vanadium salt or complex salt containing such vanadium; a separator sandwiched between the first and the second vanadium compounds for selectively passing through ions; a negative electrode connected to the first vanadium compound; and a positive electrode connected to the second vanadium compound can be obtained.

(Outline of Solid Vanadium Redox Rechargeable Battery and Description of Manufacturing Method)

The outline of the vanadium battery and its manufacturing method according to an embodiment of the present invention will hereinafter be described by referring to FIGS. 1 to 11.

FIG. 1 is a schematic diagram of a solid vanadium redox rechargeable battery 100 according to the present invention.

The solid vanadium redox rechargeable battery 100 includes: a first vanadium compound 120; a second vanadium compound 140; an ion exchange membrane 130 that functions as a separator; a positive electrode 150 connected to the first vanadium compound; and a negative electrode 110 connected to the second vanadium compound. The first vanadium compound 140 and the second vanadium compound 120 contact each other via the ion exchange membrane 130.

In this embodiment, the positive electrode 150 and the negative electrode 110 are both disks having diameter of 3 cm. The thickness of the first and the second vanadium compounds 140, 120 is approximately 6 mm. Of course, the components of the solid vanadium battery according to the present invention need not be of such size and shape. For example, the shape of the positive electrode 150 and the negative electrode 110 need not be circular, but can be a polygonal shape, or in a shape appropriate for the site of use of the battery.

Figure 2:
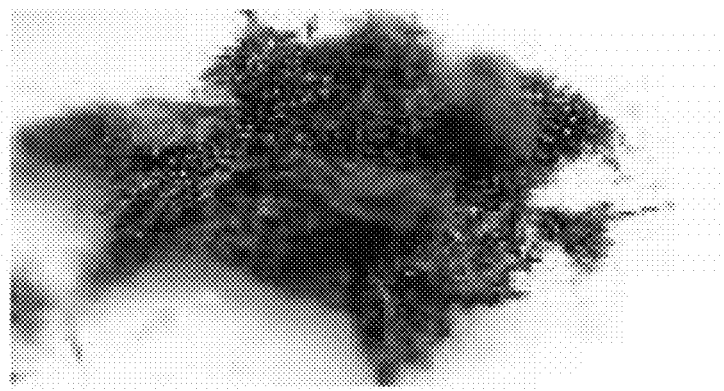
FIG. 2 is a photo of a first solid vanadium compound to be connected to the negative electrode of the solid vanadium redox rechargeable battery shown in FIG. 1.

The first vanadium compound 120 is fabricated by mixing solid powder of vanadium(III) sulfate n-hydrate containing vanadium, whose oxidation number changes between 2 and 3 as a result of respective absorption and discharge of $H^+$ due to oxidation and reduction reactions, and carbon fiber ground into powder, and by adding a small amount of sulfuric acid solution to the mixed powder. The amount of sulfuric acid solution should be sufficient for the rechargeable battery to be in the state of charge (SOC) of 0% to 100%. However, depending on circumstances, the amount is allowed to cover the SOC of 20% to 80% only. FIG. 2 is a photo of the first vanadium compound 120. Of course, carbon fiber need not be ground. The method of manufacturing vanadium(III) sulfate salt contained in vanadium(III) sulfate n-hydrate will hereinafter be described in detail.

In this embodiment, the first vanadium compound 120 is rather a vanadium mixture and slurry. However, the first vanadium compound 120 may have the hardness allowing it to be called as a solid.

The second vanadium compound 140 is created by mixing vanadyl(IV) sulfate m-hydrate containing vanadium, whose oxidation number changes between 5 and 4 as a result of respective discharge and absorption of ions due to reduction and oxidation reactions, and carbon fiber ground into powder, and by adding a small amount of sulfuric acid solution to the mixed powder. The amount of sulfuric acid solution should be sufficient for the rechargeable battery to be in the state of charge (SOC) of 0% to 100%. However, depending on circumstances, the amount is allowed to cover the SOC of 20% to 80% only. FIG. 3 is a photo of the second vanadium compound 140. Of course, as in the case of the first vanadium compound, carbon fiber need not be ground. The method of manufacturing solid vanadium(IV) sulfate salt contained in vanadyl(IV) sulfate m-hydrate will hereinafter be described in detail.

In this embodiment, the second vanadium compound 140 is rather a vanadium mixture and slurry. However, the second vanadium compound 140 may have the hardness allowing it to be called as a solid.

The amount of the sulfuric acid solution added to the solid vanadium(III) sulfate n-hydrate and the solid vanadyl(IV) sulfate n-hydrate is set not to the first and the second vanadium compounds 120, 140 turn into liquid completely. By doing so, in the first and the second vanadium compounds 120, 140, chemical reactions given by [Chemical formula 7], [Chemical formula 8], [Chemical formula 12], and [Chemical formula 13] can occur.

The positive electrode 150 and the negative electrode 110 are made of carbon cloth.

The carbon cloth of the positive electrode 150 and the negative electrode 110 and the carbon fiber in the first and the second vanadium compounds 120, 140 may be integrated into one.

The solid vanadium redox rechargeable battery obtained in this way is in a state of zero-charged state.

In this embodiment, the first vanadium compound 120 and the negative electrode 110, and the second vanadium compound 140 and the positive electrode 150, are provided as separate components. Since the first and the second vanadium compounds 120,140 contain carbon fiber ground into powder form, it is also possible to regard the surface where the solid vanadium(III) sulfate n-hydrate and solid vanadyl(IV) sulfate n-hydrate do not appear as carbon electrodes. In this case, the first and the second vanadium compounds respectively include the surface that functions as a negative electrode and a positive electrode.

Figure 4:
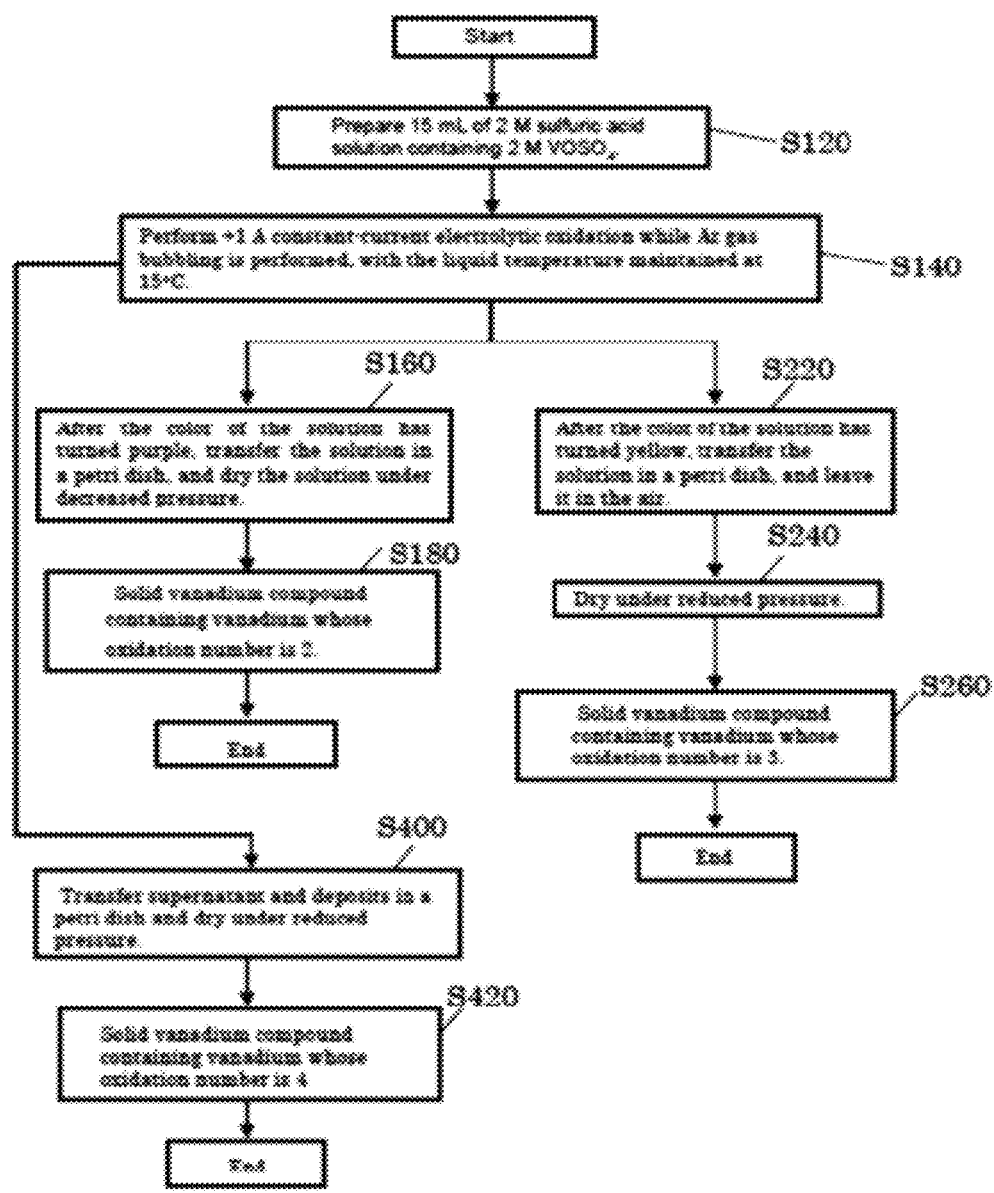
FIG. 4 is a flow chart illustrating a method of creating a solid vanadium active material according to the present invention including the step of electrolytic reduction.

Here, the method of manufacturing solid powder of vanadium(III) sulfate salt contained in the first vanadium compound 120 of the solid redox vanadium battery in zero-charged state will be described by referring to FIG. 4.

First, in S120, 15 mL of 2 M sulfuric acid solution containing 2 M $VOSO_4$ is prepared.

Next, in S140, this sulfuric acid solution is poured into a beaker-shaped cell, and electrolytic reduction is performed for five hours, using a platinum plate as a work electrode, a platinum plate as a counter electrode, and an ion exchange membrane (Selemion APS (registered trademark), AGC Engineering Co., Ltd.) as a membrane. More specifically, the work electrode and the counter electrode are connected to a stabilized power supply, 1 A constant-current electrolytic reduction is performed for five hours while Ar gas bubbling is performed, with the liquid temperature maintained at 15° C., and then S220 is performed.

In S220, the solution is transferred to a petri dish, and left in the air for 12 hours for oxidation.

After visually checking that the color of the solution had changed from purple to green completely in the next step S240, the solution was dried under reduced pressure for one week.

In S260 after S240, solid vanadium(III) sulfate salt containing vanadium having oxidation number of 3 is obtained.

Figure 5:
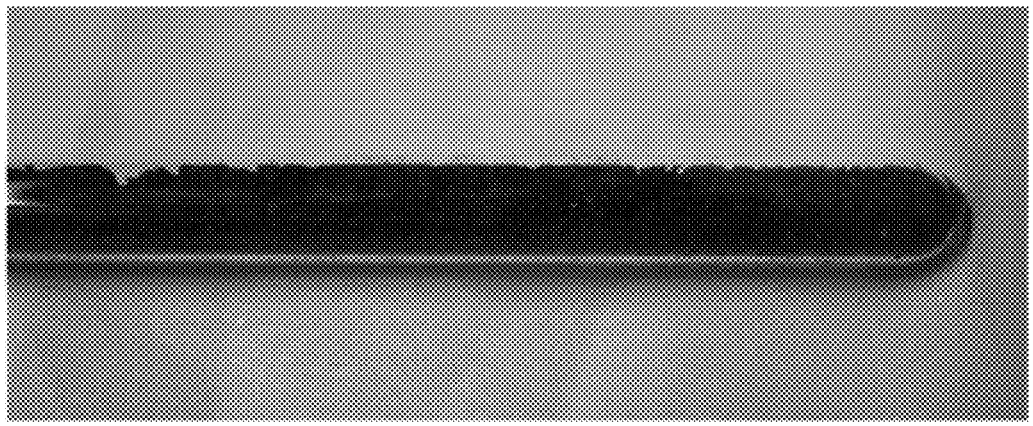
FIG. 5 is a photo of sulfate salt of solid vanadium(III) sulfate created by the method shown in FIG. 4.

FIG. 5 is a photo of solid vanadium(III) sulfate salt fabricated by such method. It is apparent that it is in a state of solid powder. Hence, solid vanadium(III) sulfate n-hydrate can be obtained.

As described above, solid powder of this vanadium(III) sulfate n-hydrate and carbon fiber ground into powder are mixed, and a small amount of sulfuric acid solution is added to the mixture, and as a result solid vanadium compound 120 containing vanadium having oxidation number of 3 can be obtained.

FIG. 2 is a photo of the first vanadium compound 120 thus obtained.

This first vanadium compound 120 in solid state has a function as a solid-state salt containing an active material.

A method of manufacturing solid powder of vanadium(IV) sulfate salt contained in the second vanadium compound 140 will then be described by referring to FIG. 4 again.

To create solid vanadyl(IV) sulfate salt, 15 mL of 2 M sulfuric acid solution is prepared in S120 as the same way in the case of preparation of solid powder of vanadium(III) sulfate salt.

Then in S400, the solution is transferred to a petri dish, and dried under decreased pressure. In S420 next to S400, vanadium(IV) sulfate salt containing vanadium whose oxidation number is 4 is obtained. Solid vanadyl(IV) sulfate n-hydrate can thus be obtained.

This solid vanadyl(IV) sulfate n-hydrate is mixed with the powder obtained by grinding carbon fiber as described above, and by adding a small amount of sulfuric acid solution, a solid-state electrolyte containing the active material can be obtained. This solid-state electrolyte is used as the second vanadium compound 140 in this embodiment.

Figure 3A:
FIG. 3A is a photo of a solid vanadium compound to be connected to the positive electrode of the solid vanadium redox rechargeable battery shown in FIG. 1, with the active material supported by electrode material according to supporting method 1.

FIG. 3A is a photo of the second vanadium compound 140 created in this way. The method of mixing solid vanadyl(IV) sulfate n-hydrate with the powder obtained by grinding carbon fiber as described above, and then adding a small amount of sulfuric acid solution, thus allowing conductive material of the rechargeable battery 100 to support the active material, is called supporting method 1. The conductive material may also form a part of the electrode. Carbon is available as a conductive material. Carbon may be in a form of carbon fiber, or carbon felt made of carbon fiber.

This solid-state second vanadium compound 140 has a function of a solid-state electrolyte containing active material.

Figure 3B:
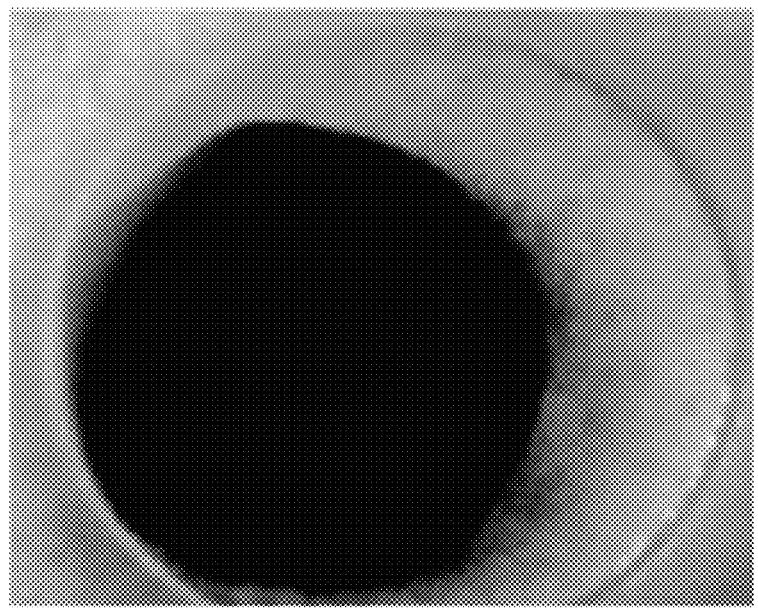
FIG. 3B is a photo of a solid vanadium compound to be connected to the positive electrode of the solid vanadium redox battery shown in FIG. 1, with the active material supported by electrode material according to supporting method 2.

FIG. 3B is a photo of the second solid vanadium compound connected to the positive electrode of the solid vanadium redox rechargeable battery shown in FIG. 1, with the active material supported by electrode material by method 2, which is different from method 1 described above.

In supporting method 2, carbon fiber is immersed in a vanadyl(IV) sulfate solution, which then undergoes vacuum drying to evaporate liquid. The solid vanadium compound shown in FIG. 3B was obtained by conducting vacuum drying for three hours in a state where carbon fiber was immersed in the vanadyl(IV) sulfate solution, thus evaporating excessive liquid. By using supporting method 2, wherein a conductive material is immersed in a vanadium solution containing vanadium salt or complex salt, and vacuum drying is conducted, solid vanadium salt or complex salt is supported on the surface of the conductive material.

Here, "evaporating excessive liquid" may mean that the amount of sulfuric acid solution sufficient for the rechargeable battery to be in the state of charge (SOC) of 0% to 100% is retained, and remaining amount of solution is evaporated. Depending on circumstances, however, it may mean that the amount of sulfuric acid solution sufficient to cover the SOC of 20% to 80% is retained, and remaining amount of solution is evaporated.

Similar to the above second solid vanadium compound, to obtain a first solid vanadium compound to be connected to the negative electrode of the solid vanadium redox rechargeable battery as shown in FIG. 1 by method 2, carbon fiber is immersed in a vanadium(III) sulfate solution, and the solution is subjected to vacuum drying to evaporate unnecessary liquid.

By fabricating an electrode-active material mixture in this way, the active material is supported by the electrode material, and a solid redox rechargeable battery having an essentially different structure from the so-called stationary-electrolyte-type redox battery can be obtained.

In addition, when manufacturing a battery using the solid-state second vanadium compound 140 fabricated by method 2, the assembly work is facilitated and simplified because there is no concern about leakage of liquid.

The operation of the solid vanadium battery 100 thus structured will be described by referring to FIG. 6.

The solid vanadium battery 100 containing a first vanadium compound 120, which includes solid powder of vanadium(III) sulfate, and a second vanadium compound 140, which includes solid powder of vanadyl(IV) sulfate, is in 0% charged state in the initial state.

Figure 6:
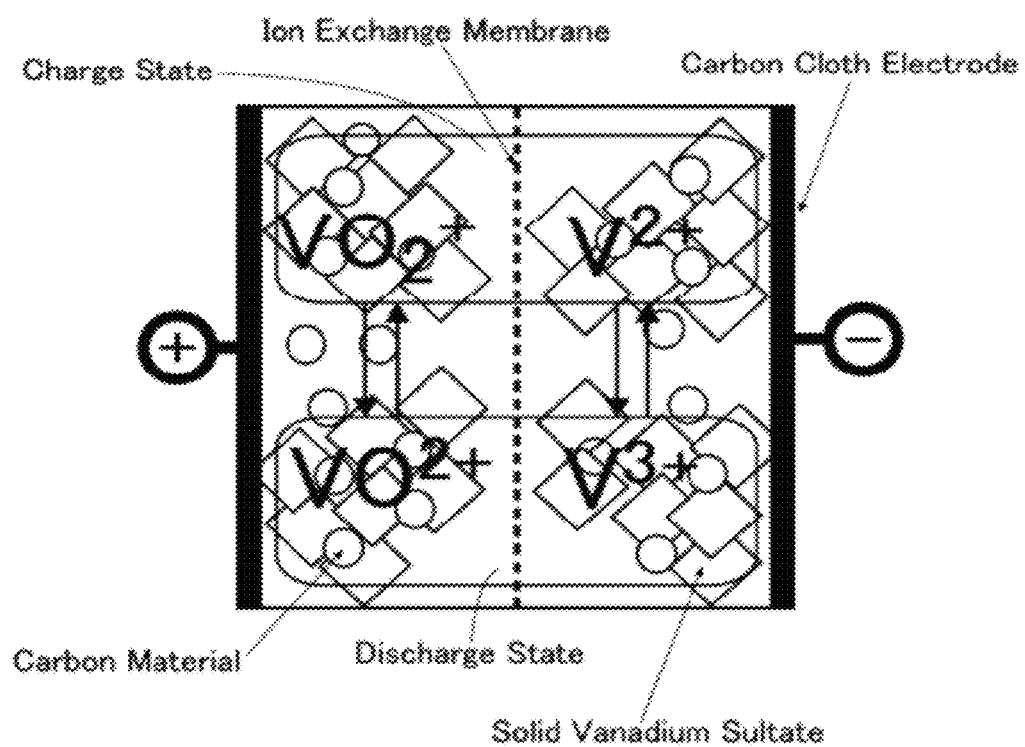
FIG. 6 is a chart illustrating the operation of the solid vanadium redox rechargeable battery shown in FIG. 1.

In other words, as shown in FIG. 6, in the second vanadium compound 140 on the positive electrode side in the initial state, $VO^{2+}(aq)$, which appears in [Chemical formula 1] is generated from $(VO_2)_2SO_4(aq)$, which is generated by chemical reactions given by [Chemical formula 7] to [Chemical formula 11], [Chemical formula 7] in particular.

Furthermore, in the first vanadium compound 120 on the negative electrode side in the initial state, $V^{3+}(aq)$, which appears in [Chemical formula 2], is generated from $V_2(SO_4)_3$, which is generated by chemical reactions given by [Chemical reaction 12] to [Chemical reaction 14], [Chemical reaction 12] in particular.

Namely, the solid vanadium battery 100 is in "discharged state" as shown in FIG. 6 immediately after manufacture.

When the sufficiently large voltage is then applied between the positive electrode and the negative electrode, $V^{4+}(aq)$ in the second vanadium compound 140 is oxidized to $V^{5+}(aq)$ as a result of progress of the reaction as shown below.

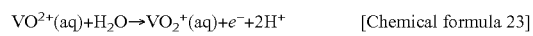

$VO^{2+}(aq)+H_2O \rightarrow VO_2^+(aq)+e^-+2H^+$ [Chemical formula 23]

At the same time, $V^{3+}(aq)$ in the first vanadium compound 120 is reduced to $V^{2+}(aq)$ as a result of progress of the reaction shown below.

$V^{3+}(aq)+e^- \rightarrow V^{2+}(aq)$ [Chemical reaction 24]

The potential difference between the electrodes is approximately 1.0 V immediately after charging is started. The voltage is increasing gradually while charging is performed, and when the charging is completed, the open-circuit voltage of the battery becomes approximately 1.58 V. In this state, the vanadium battery 100 is in "charged state" as shown in FIG. 6.

In addition, when the electrical load is connected between the positive electrode and the negative electrode after charging is completed, the reaction reverse to the one that occurs at the time of charging as shown below progresses, and the battery is discharged.

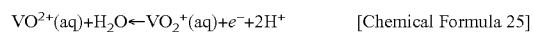

$VO^{2+}(aq)+H_2O \leftarrow VO_2^+(aq)+e^-+2H^+$ [Chemical Formula 25]

$V^{3+}(aq)+e^- \leftarrow V^{2+}(aq)$ [Chemical formula 26]

Figure 7:
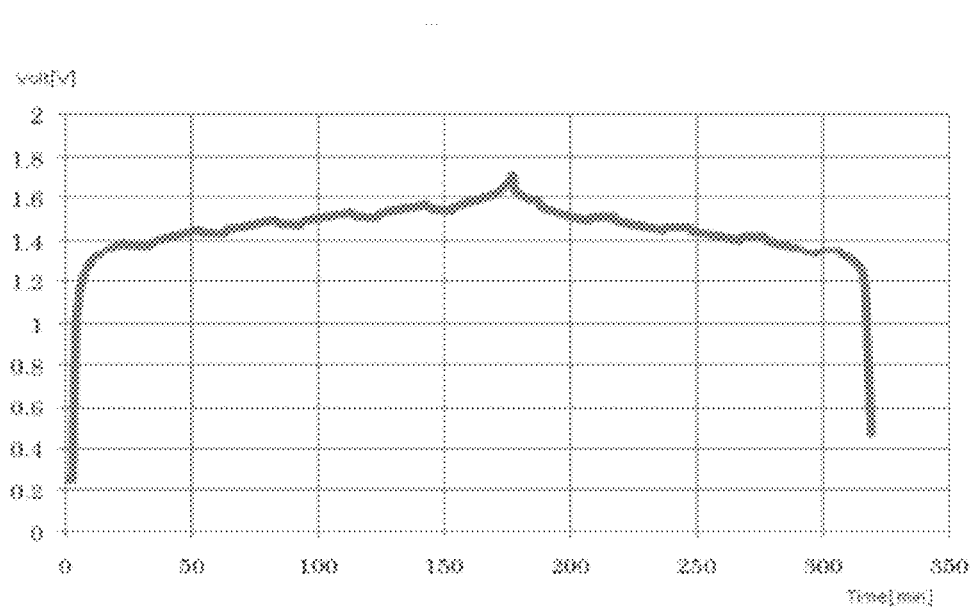
FIG. 7 is a chart showing a typical charging/discharging cycle of the solid vanadium redox rechargeable battery shown in FIG. 1.

FIG. 7 is a chart showing a typical charging and discharging cycle.

As shown in FIG. 7, the open-circuit voltage of the battery is approximately 1.1 V. It is apparent that when the sufficiently large voltage is applied between the positive electrode and the negative electrode for charging using an external power supply, thus forcibly feeding current of 6 mA to the vanadium redox flow battery, and when charging is completed and the charging state reaches 100%, the open-circuit voltage of the battery becomes approximately 1.6 V.

FIG. 7 shows that the energy required for completion of charging was 65.4 J, whereas the discharged energy was 47.8 J. Hence, the energy efficiency is calculated to be 73%. Meanwhile, the energy density of the solid vanadium battery according to this embodiment was 42.73 Wh/kg, which is much higher than the typical value of vanadium redox flow battery of 18 Wh/kg.

Chemical reactions that progresses at the time of charging given by [Chemical formula 23] and [Chemical formula 24] and chemical reactions that progresses at the time of discharging given by [Chemical formula 25] and [Chemical formula 26] are not thermodynamically reversible. When discharging is performed after charging, over voltage is generated in the battery.

Figure 8:
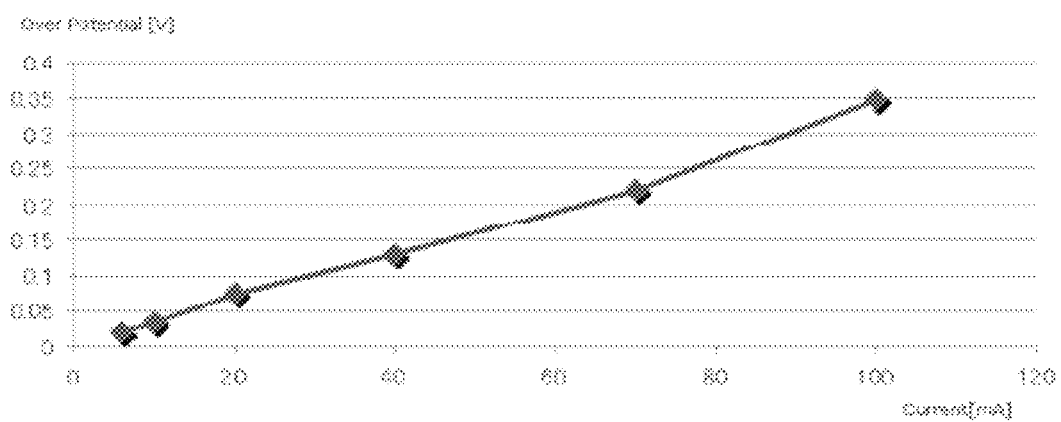
FIG. 8 is a chart showing the dependency of over potential on the current of the solid vanadium redox rechargeable battery shown in FIG. 1.

FIG. 8 is a chart showing the dependency of over voltage of the solid vanadium battery according to this embodiment on current.

To obtain this value, after charging was performed for 20 minutes and open-circuit voltage was measured for 10 minutes to measure the over voltage at the time of charging. For discharging also, over voltage was measured under the same conditions. The equal current value was selected both for charging and discharging, and the current value was kept constant during the experiment.

In the above, solid vanadium(III) sulfate n-hydrate was used as the first vanadium compound 120, and solid vanadyl (IV) sulfate n-hydrate was used as the second vanadium compound 140.

However, it is also possible to use solid vanadium(II) sulfate n-hydrate as the first vanadium compound 120 and solid vanadyl(V) sulfate n-hydrate as the second vanadium compound 140.

Now, a method of manufacturing solid vanadium(II) sulfate salt contained in the first vanadium compound 120 of the solid redox vanadium battery in 100% charged state will be described by referring to FIG. 4.

First, 20 mL of 2M sulfuric acid solution containing 2M $VOSO_4$ is prepared in S120.

Then in S140, this sulfuric acid solution is poured into a beaker-shaped cell, and electrolytic reduction is performed for five hours, using a platinum plate as a work electrode, a platinum plate as a counter electrode, and an ion exchange membrane (Selemion APS (registered trademark), AGC Engineering Co., Ltd.) as a separator. More specifically, the work electrode and the counter electrode are connected to a stabilized power supply, 1 A constant-current electrolytic reduction is performed for five hours while Ar gas bubbling is performed, with the liquid temperature maintained at 15° C., and then S160 is performed.

In the next S160, after visually checking that the color of the solution has changed from blue to purple completely, the solution was transferred to a petri dish and dried for 12 hours under reduced pressure.

In S180 subsequent to S160, solid vanadium compound containing vanadium whose oxidation number is 2 is obtained.

By mixing the solid powder of this vanadium(II) sulfate salt with the powder obtained by grinding carbon fiber, and then by adding a small amount of sulfuric acid solution to the mixture, namely by method 1, a solid vanadium compound containing this vanadium whose oxidation number is 2, with the active material supported by the conductive material, can be obtained. It is possible to use this solid vanadium compound as the first vanadium compound 120. Such solid vanadium compound 120 is a solid vanadium(II) sulfate n-hydrate.

In the case where the first vanadium compound 120 is a solid vanadium compound containing divalent vanadium also, the first vanadium compound 120 can be created using the above supporting method 2. Namely, carbon fiber is immersed in a vanadium(II) sulfuric acid solution, and subjecting the carbon fiber immersed in the solution to vacuum drying to evaporate unnecessary liquid component. The duration of vacuum drying may be three hours, for example.

When using a solid vanadium compound containing vanadium(II) sulfate salt as the first vanadium compound 120, it is desirable that the second vanadium compound contain vanadium whose oxidation number is 5. Based on this structure, a solid redox vanadium battery in 100% charged state can be obtained.

Figure 9:
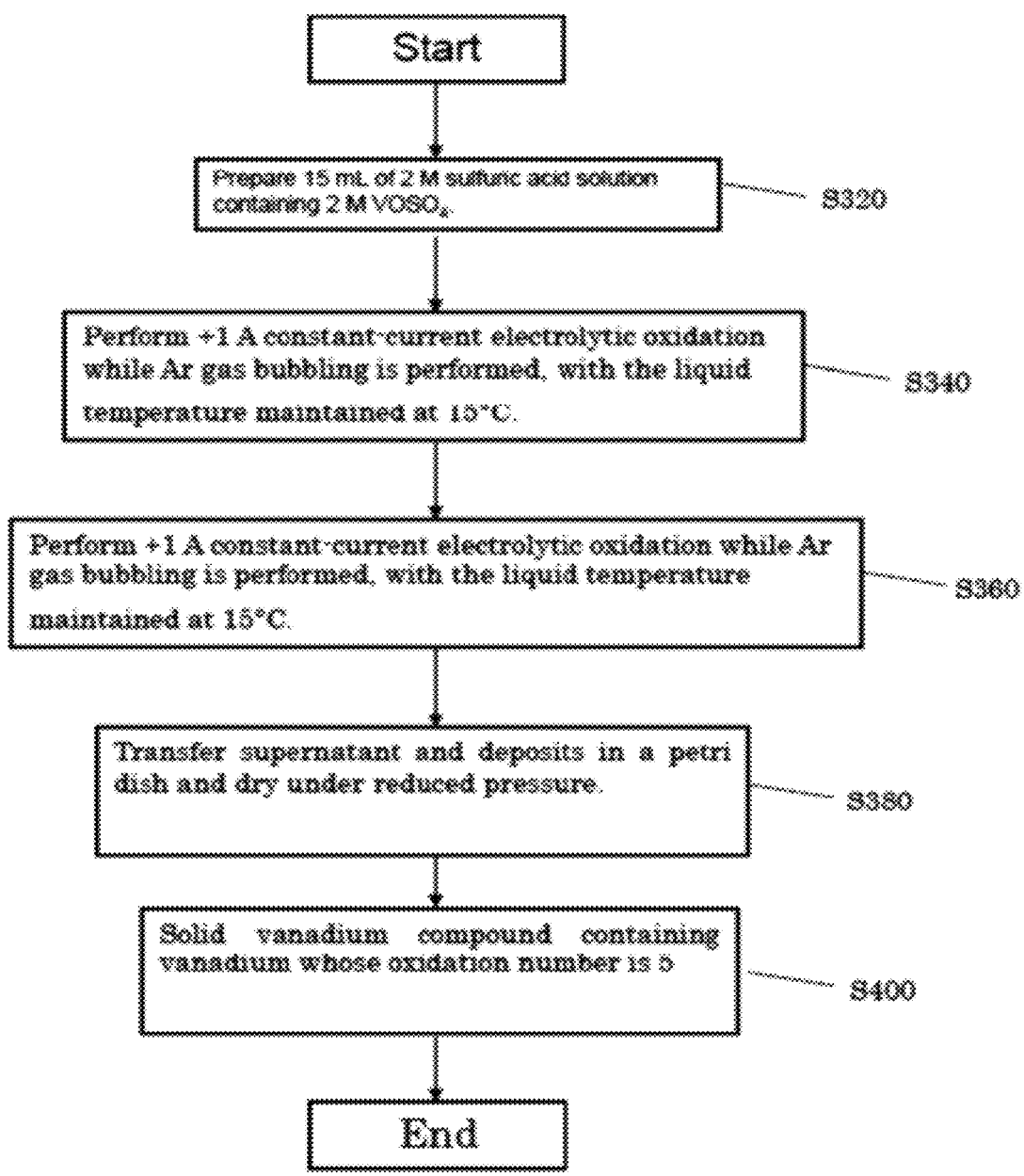
FIG. 9 is a flow chart showing a method of creating a solid vanadium active material according to the present invention including a step of electrolytic oxidation.

The method of manufacturing solid vanadyl(V) sulfate salt contained in the second vanadium compound 120 of the solid redox vanadium battery in 100% charged state will be described by referring to FIG. 9.

First, 20 mL of 2M sulfuric acid solution containing 2M $VOSO_4$ is prepared in S320.

Then in S340, this sulfuric acid solution is transferred to a beaker-shaped cell, and electrolytic reduction is performed for two and a half hours, using a platinum plate as a work electrode, a platinum plate as a counter electrode, and an ion exchange membrane (Selemion APS (registered trademark)), AGC Engineering Co., Ltd.) as a separator. More specifically, the work electrode and the counter electrode are connected to a stabilized power supply, 1 A constant-current electrolytic reduction is performed for two and a half hours while Ar gas bubbling is performed, with the liquid temperature maintained at 15° C., and then S360 is performed. Although Selemion APS (registered trademark) by AGC Engineering Co., Ltd. was used in this case, Neosepta (registered trademark) CMX C-1000 may be used.

In S360, it is visually checked that the color of the solution has changed from blue to yellow completely, and that dark reddish brown deposits have been generated.

In S380 subsequent to S360, the supernatant and deposits are dried under reduced pressure for two weeks.

Finally, in S390, a solid vanadium compound containing vanadium whose oxidation number is 5 is obtained.

Figure 10:
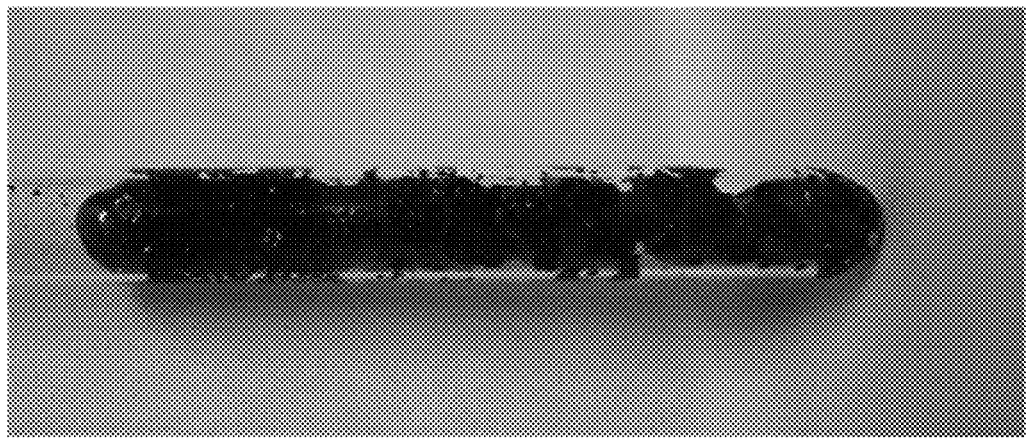
FIG. 10 is photo of solid vanadium(V) sulfate salt created by the method shown in FIG. 4.

FIG. 10 is a photo of a solid vanadium(V) sulfate salt prepared by the above method. It is apparent that it is in a state of solid powder. From this vanadium(V) sulfate salt, vanadyl (V) sulfate n-hydrate can be obtained.

Solid powder of this vanadyl(V) sulfate n-hydrate is mixed with the powder obtained by grinding carbon fiber are mixed, and by adding a small amount of sulfuric acid solution to the mixture, namely by the method 1 described above, a solid vanadium compound containing this vanadium whose oxidation number is 5 can be obtained.

It is also possible to use this solid vanadium sulfate salt containing vanadium whose oxidation number is 5 as the second vanadium compound 140 in this embodiment.

The vanadium battery structured using solid vanadium(II) sulfate n-hydrate as the first vanadium compound 120 and solid vanadyl(V) sulfate n-hydrate as the second vanadium compound 140 includes an advantage that discharge is allowed even immediately after manufacture while functional effect in all the embodiments is ensured.

Consequently, the vanadium battery according to this embodiment includes: a slurry first vanadium mixture, with sulfuric acid moistening therein, including solid vanadium sulfate whose oxidation number changes between 2 and 3 due to oxidation and reduction reactions and carbon; a slurry second vanadium mixture, with sulfuric acid moistening therein, including solid vanadyl sulfate whose oxidation number changes between 5 and 4 due to reduction and oxidation reactions and carbon; a separator sandwiched between the first and the second vanadium mixtures for selectively passing through; a negative electrode connected to the first vanadium mixture; and a positive electrode connected to the second vanadium mixture. In the first vanadium mixture, chemical reactions given by the following chemical formulae occur.

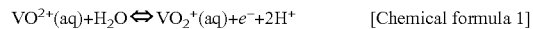

$VO^{2+}(aq)+H_2O \Leftrightarrow VO_2^+(aq)+e^-+2H^+$ [Chemical formula 1]

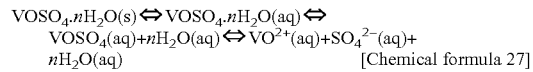

$VOSO_4 \cdot nH_2O(s) \Leftrightarrow VOSO_4 \cdot nH_2O(aq) \Leftrightarrow$
$\quad VOSO_4(aq)+nH_2O(aq) \Leftrightarrow VO^{2+}(aq)+SO_4^{2-}(aq)+$
$\quad nH_2O(aq)$ [Chemical formula 27]

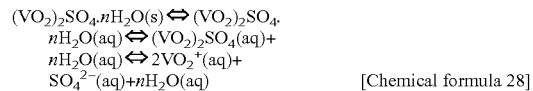

$(VO_2)_2SO_4 \cdot nH_2O(s) \Leftrightarrow (VO_2)_2SO_4 \cdot$
$\quad nH_2O(aq) \Leftrightarrow (VO_2)_2SO_4(aq)+$
$\quad nH_2O(aq) \Leftrightarrow 2VO_2^+(aq)+$
$\quad SO_4^{2-}(aq)+nH_2O(aq)$ [Chemical formula 28]

In the second vanadium mixture, reactions given by the following chemical formulae occur.

$V^{3+}(aq)+e^- \Leftrightarrow V^{2+}(aq)$ [Chemical formula 2]

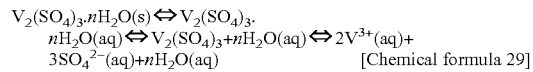

$V_2(SO_4)_3 \cdot nH_2O(s) \Leftrightarrow V_2(SO_4)_3 \cdot$
$\quad nH_2O(aq) \Leftrightarrow V_2(SO_4)_3+nH_2O(aq) \Leftrightarrow 2V^{3+}(aq)+$
$\quad 3SO_4^{2-}(aq)+nH_2O(aq)$ [Chemical formula 29]

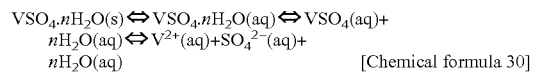

$VSO_4 \cdot nH_2O(s) \Leftrightarrow VSO_4 \cdot nH_2O(aq) \Leftrightarrow VSO_4(aq)+$
$\quad nH_2O(aq) \Leftrightarrow V^{2+}(aq)+SO_4^{2-}(aq)+$
$\quad nH_2O(aq)$ [Chemical formula 30]

The separator selectively allows at least one of hydrogen ions, sulfate ions, and sulfite ions to pass through.

With the vanadium battery structured in this way, the high energy density can be achieved. In addition, by using vanadium salt or vanadium complex salt in slurry state, the high battery capacity can be obtained. Consequently, a solid vanadium rechargeable battery having high energy density can be obtained while high battery capacity is maintained.

With the vanadium battery according to this embodiment, the safety of vanadium battery is ensured while large electromotive force is assured.

With the vanadium battery structured in this way, since generation of dendrite is suppressed, a rechargeable battery having high durability can be obtained.

Since the first and the second vanadium mixtures are in slurry state, ionic conductivity is large, and as a result overheating of the battery can be suppressed.

Figure 11:
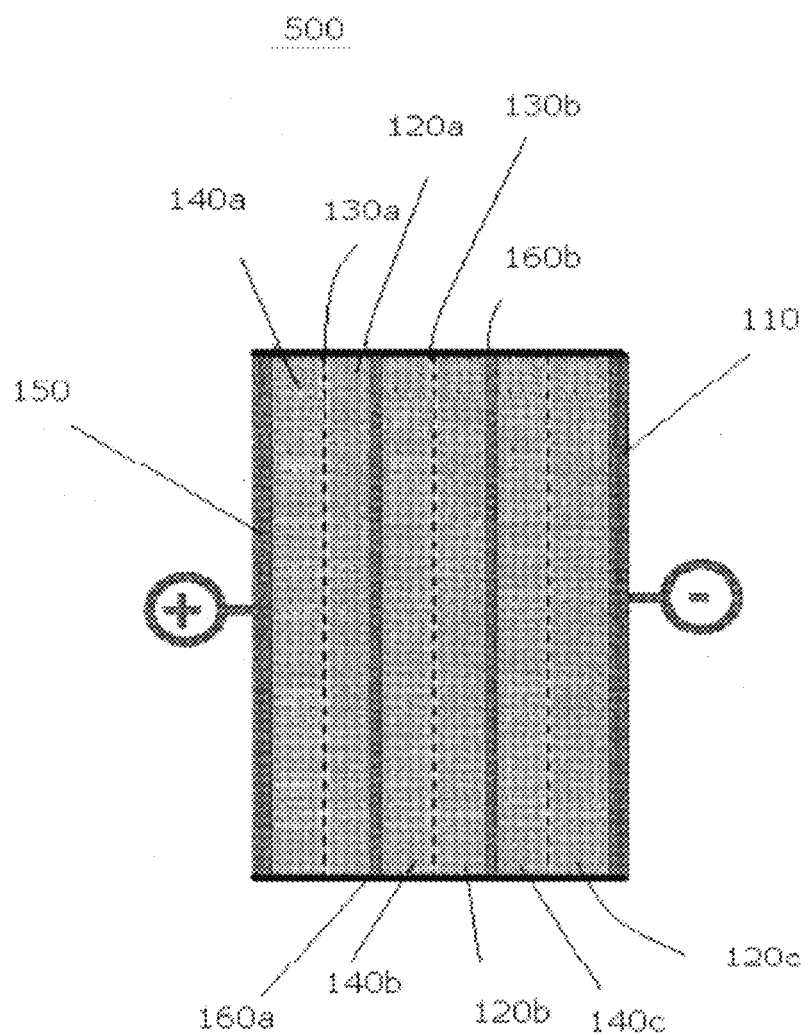
FIG. 11 is an example of variation of the solid vanadium redox rechargeable battery according to the present invention.

FIG. 11 is a modification of the solid vanadium redox battery as shown in FIG. 1.

For members of the solid vanadium battery 500 in this modification that have the identical or similar functions as those of the solid vanadium redox battery 100 as shown in FIG. 1, the same reference signs are given, and detailed description is omitted.

While the solid vanadium battery 100 as shown in FIG. 1 is structured with single stack, the solid vanadium battery 500 as shown in FIG. 11 is structured with three stacks. Namely, the solid vanadium battery as shown in FIG. 11 has a structure wherein three battery as shown in FIG. 1 are stacked in series on top of one another.

In FIG. 11, the solid vanadium battery 500 includes, a positive electrode 150, negative electrode 110, first vanadium compounds 120*a*, 120*b*, 120*c*, second vanadium compounds 140*a*, 140*b*, 140*c*, separators 130*a*, 130*b*, and electrodes 160*a*, 160*b*.

The first vanadium electrolytes 120*a*, 120*b*, 120*c* are similar to the first vanadium compound 120 of the solid vanadium battery 100. The second vanadium compounds 140*a*, 140*b*, 140*c* are similar to the first vanadium compound 140 of the solid vanadium battery 100, but all of these need not be the same. Meanwhile, the ion exchange membranes 130*a*, 130*b* are similar to the separator 130 of the solid vanadium battery 100.

The positive electrode 150 and the negative electrode 110 are placed facing opposite to each other. Between the positive electrode 150 and the negative electrode 110, a second vanadium electrolyte 140*a*, an ion exchange membrane 130*a*, a first vanadium electrolyte 120*a*, an electrode 160*a*, a second vanadium electrolyte 140*b*, a separator 130*b*, a first vanadium electrolyte 120*b*, an electrode 160*b*, a second vanadium electrolyte 140*c*, a separator 130*c*, and a first vanadium electrolyte 120*c* are stacked on top of one another in that order in the direction from the positive electrode 150 toward the negative electrode 110.

By structuring the solid vanadium battery 500 in this way, large output voltage can be obtained, in addition to the functional effect ensured by the solid vanadium battery 100.

(Performance Characteristics of the Solid Vanadium Redox Rechargeable Battery According to the Present Invention)

The performance characteristics of the solid vanadium redox rechargeable battery according to an embodiment of the present invention will be described by referring to FIGS. 12 to 18 while comparison is made with the solid vanadium redox rechargeable battery according to another embodiment.

Table 1 as shown below lists the method of creating this solid vanadium redox rechargeable battery, operation conditions, and characteristics.

TABLE 1

| Category | | Setting |
|---|---|---|
| Characteristics | Cell voltage [V] | 1.5 |
| | Weight energy density [Wh/kg$^{-1}$] | 70 |
| Membrane | Ion exchange membrane | Neosepta CMXC-1000 |
| | Carbon felt | XF30ADP14, 3.8 mm |
| | Area [cm$^2$] | 2.35 |
| | Supporting method | Method 2 |
| | Mass of active material [mol] | $4.6 \times 10^{-4}$ |
| | Molar ratio of active materials $\theta = V(III)/V(IV)$ | 1 |
| Method of operation | Current density [mAcm$^2$] | 5 |
| | Depth profile [V] (Cutoff voltage $E_{CO}$) | 0.7 |

As shown in Table 1, in a favorable embodiment of the solid vanadium redox rechargeable battery according to the present invention, an ion exchange membrane commercially available by the name of Neosepta (registered trademark) CMX C-1000, 3.8 mm-thick carbon felt commercially available by the name of XF30ADP14, and a mixture of conductive material and active material are packed in a cylindrical cell having the base area of 2.35 cm$^2$ and thickness of 3 mm, solid vanadium salt or complex salt are supported on the surface of the conductive material by supporting method 2. The content of the active material includes $4.6 \times 10^{-4}$ mol, and the molar ratio between active material on the positive electrode side and that on the negative electrode side is 1:1. In this case, the mixture of conductive material and active material includes vanadium, whose oxidation number changes due to oxidation and reduction reactions or solid vanadium salt or complex salt containing such vanadium as an active material, carbon fiber connected to an electrode as a conductive material, and in addition, sulfate ions or sulfate salt ions as counter ions against vanadium or solid vanadium slat or complex salt containing such vanadium.

As shown in Table 1, when the solid vanadium redox rechargeable battery is operated at a current density of 5 mA/cm$^2$ and a cutoff voltage of 0.7 V, its output voltage is 1.5 V, and the weight energy density reaches to 70 Wh/kg.

Figure 12:
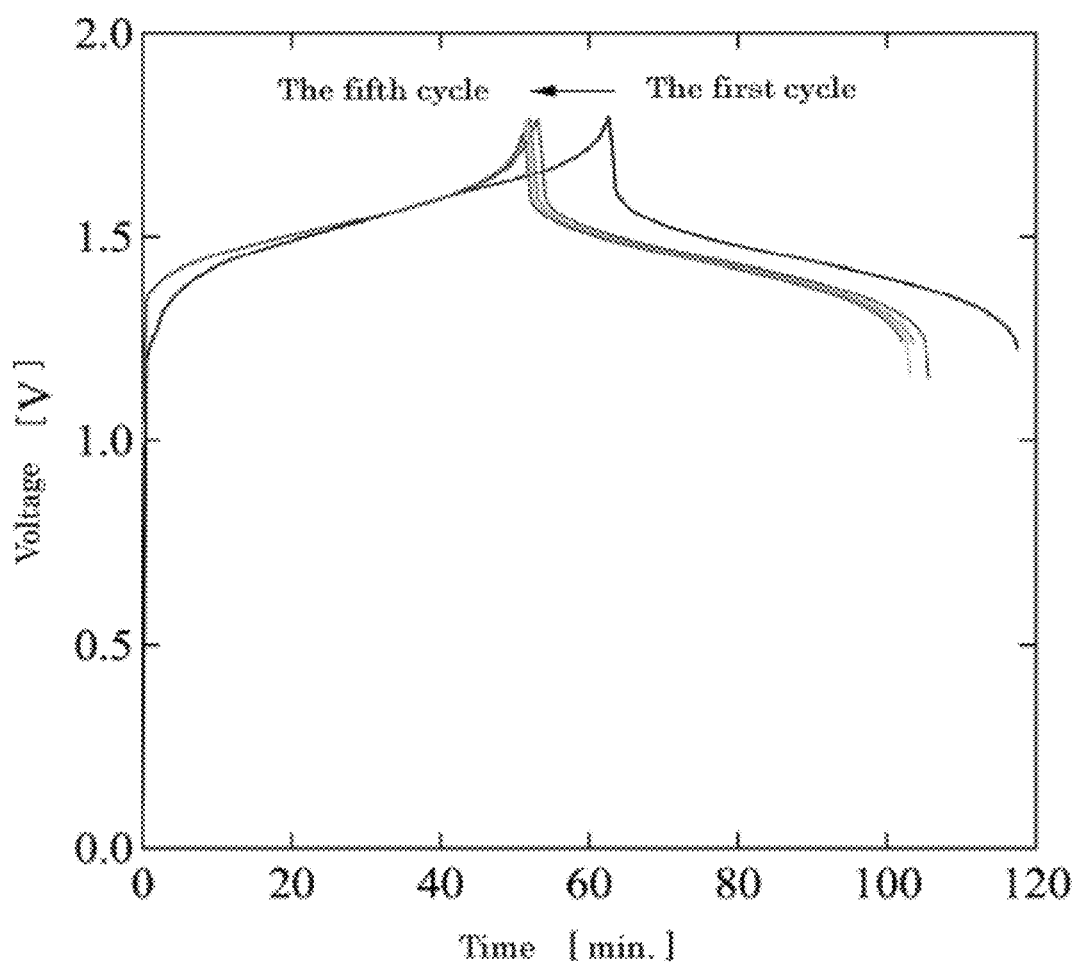
FIG. 12 is a chart showing the charging/discharging characteristics during the first 5 cycles found when the solid vanadium redox rechargeable battery according to the present invention is used at the current density of 5 mA.

FIG. 12 is a chart showing the charging and discharging characteristics for the first five cycles of the solid vanadium redox rechargeable battery according to the present invention when it was used at the current density of 5 mA.

As is shown in FIG. 12, it is apparent that stable characteristics are exhibited as a rechargeable battery because the charging and discharging curve of the second and subsequent cycles overlap with one another, except for the initial cycle (the first cycle).

Figure 13:
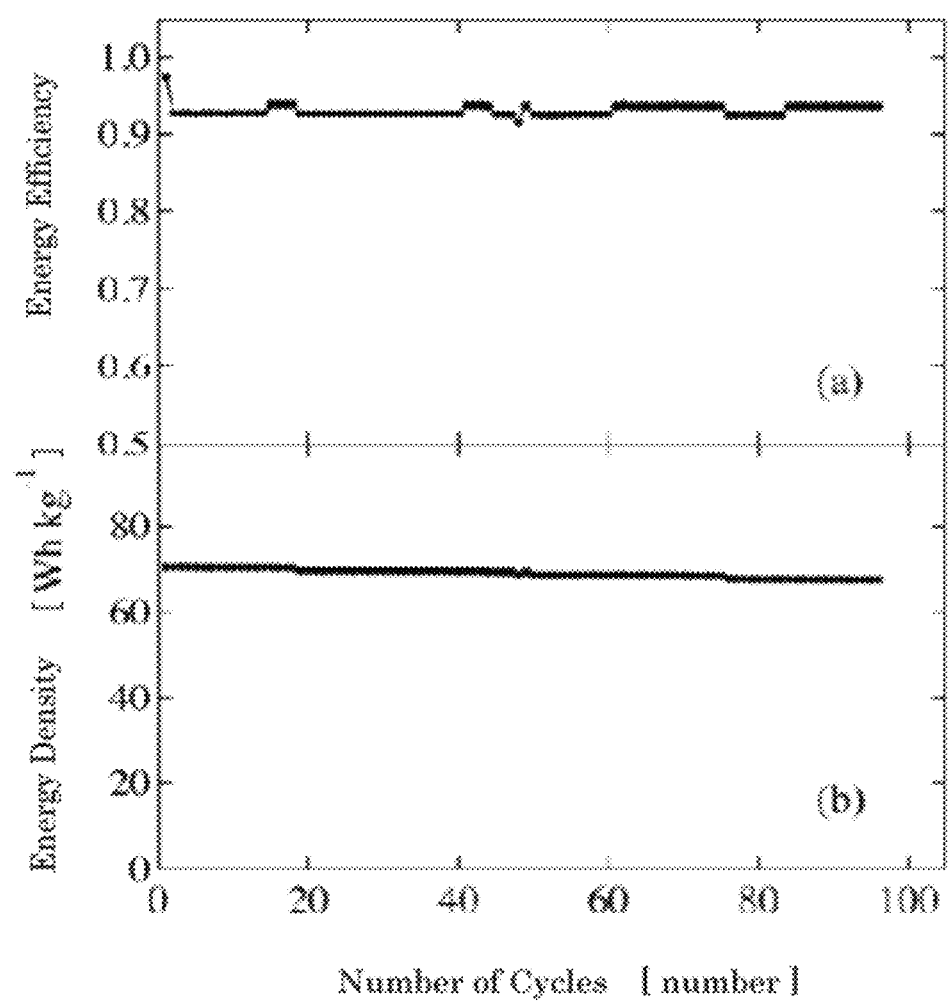
FIG. 13 is a chart showing the dependency of energy efficiency and energy density on the number of cycles during the first 96 cycles found when the solid vanadium redox rechargeable battery according to the present invention is used at the current density of 5 mA.

FIG. 13 is a chart showing the dependency of energy efficiency and energy density on the number of cycles in the first 96 cycles of the solid vanadium redox rechargeable battery according to the present invention when it is used at the current density of 5 mA. This figure exhibits that in the 2nd to the 96th cycles, the weight energy density exhibits stable characteristics with little change even if charging and discharging are repeated. In addition, the energy efficiency exhibits favorable values exceeding 90%. The average energy efficiency from the 2nd to the 96th cycles was 93%.

Figure 14:
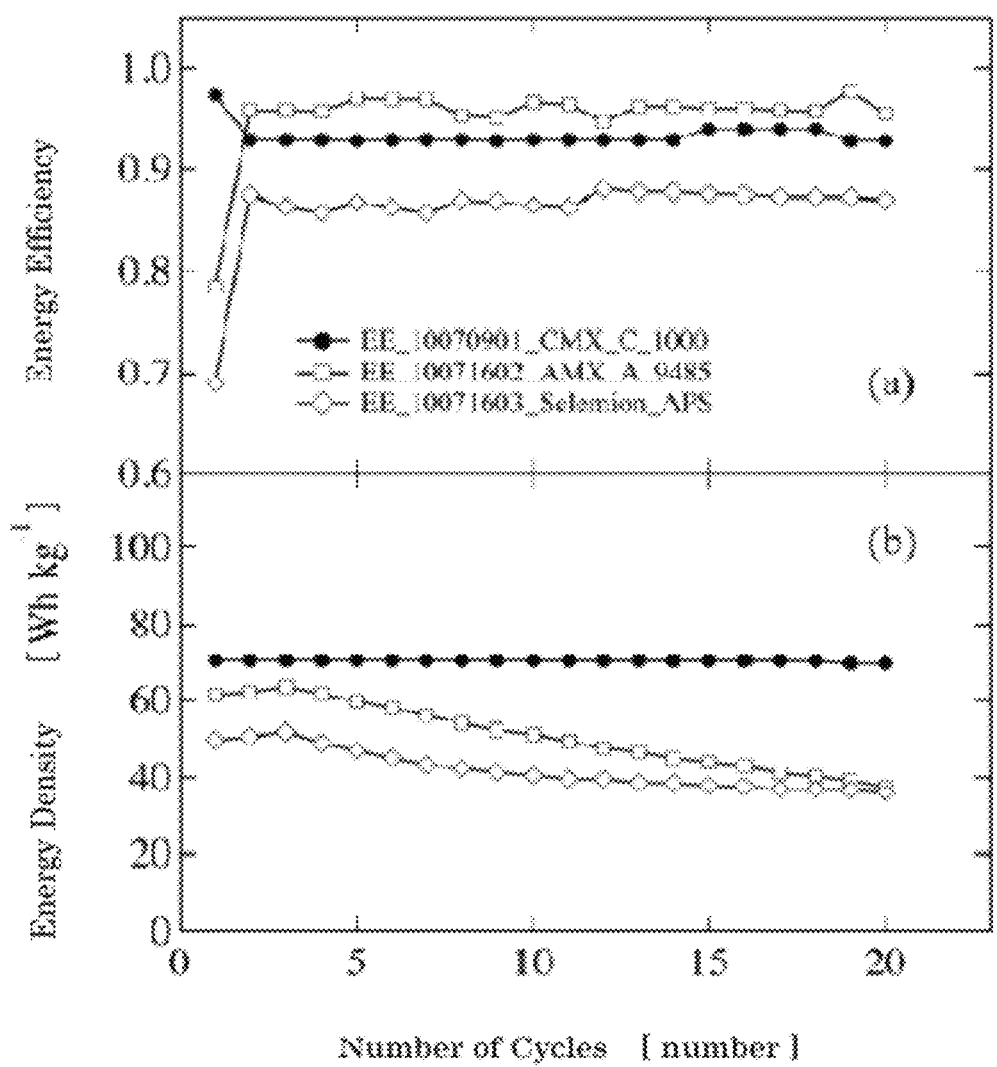
FIG. 14 is a chart showing the dependency of energy efficiency and energy density on the number of cycles of the solid vanadium redox rechargeable battery according to the present invention found when carbon felt, namely the mixture of conductive material and active material, area, supporting method, amount of active material, molar ratio between the active material on the positive electrode side and that on negative electrode side, and current density and depth profile (cutoff voltage) of the method of operation are fixed, and the ion exchange membrane is changed.

FIG. 14 is a chart showing the dependency of energy efficiency and energy density on the number of cycles of the solid vanadium redox rechargeable battery according to the present invention when the carbon felt, namely the mixture of conductive material and active material, area, supporting method, amount of the active material, molar ratio between the active material on the positive electrode side and that on the negative electrode side, and the current density and depth profile (cutoff voltage) of the method of operation are fixed and the ion exchange membrane is changed. Specifically, the 3.8 mm-thick carbon felt commercially available by the product name of XF30ADP14, namely the mixture (chemical compound) of conductive material and active material, is packed in a cylindrical cell having the base area of 2.35 cm$^2$ and thickness of 3 mm. And, the solid vanadium salt or complex salt is supported on the surface of the conductive material by supporting method 2. The amount of active material is $4.6 \times 10^{-4}$ mol, and the molar ratio between the active material on the active electrode side and that on the negative electrode side is 1:1. FIG. 14 exhibits the energy efficiency and the energy density of the solid vanadium redox rechargeable battery 100 adopting three different types of ion exchange membranes when it was operated at the current density of 5 mA/cm$^2$ and the cutoff voltage of 0.7 V.

The plot by black dots shows the charging and discharging characteristics in the first 96 cycles obtained when a cationic membrane commercially available by the product name of Neosepta (registered trademark) CMX C-1000 is used. The white squares in FIG. 14 plot show the charging and discharging characteristics in the first 96 cycles obtained when an anion membrane commercially available by the product name of Neosepta (registered trademark) AMX A-9485 is used. The white diamonds in FIG. 14 plot show the charging and discharging characteristics in the first 96 cycles when a cationic membrane commercially available by the product name of Selemion (registered trademark) APS is used. The following Table 2 shows the characteristics of these three types of ion exchange membranes.

TABLE 2

| Membrane | | Ion Exchange capacity (meq/dry-g) | Permanent selectivity (%) | Resistivity (Ω/cm$^2$) | Thickness (μm) | Energy efficiency (%) | Energy efficiency (Wh/kg$^{-1}$) |
|---|---|---|---|---|---|---|---|
| Neosepta C-1000 | Cation | 1.62 | 99 | 2.91 | 164 | 93 | 70 |
| Neosepta AMX A-9485 | Anion | 1.25 | 90.7 | 2.35 | 134 | 96 | |
| Selemion APS | Anion | 0.29 | 88.4 | 0.68 | 138 | 87 | |

When the cationic membrane commercially available by the product name of Neosepta (registered trademark) CMX C-1000 is used, the average energy density is approximately 70 Wh/kg in the 2nd to the 96th cycles, which is the best of the three ion exchange membranes. Furthermore, it is also apparent that the dependency of energy density on the number of cycles is small. Of course, the membrane is not limited to the ion exchange membrane commercially available by the product name of Neosepta (registered trademark) CMX C-1000, provided that it is cationic and has high ion exchange capacity, high permanent selectivity, and high resistivity.

The following Table 3 lists the energy efficiency of the solid vanadium redox rechargeable battery according to the present invention obtained when the ion exchange membrane, an area of the mixture of conductive material and an active material, a supporting method, an amount of active material, a molar ratio between the active material on the positive electrode side and that on the negative electrode side, and a current density and a depth profile (cutoff voltage) of the method of operation are fixed, and the carbon paper used as electrode material and the conductive material is changed. Specifically, the ion exchange membrane commercially available by the product name of Neosepta (registered trademark) CMX C-1000 and the mixture (chemical compound) of the conductive material and the active material are packed in a cylindrical cell having the base area of 2.35 cm$^2$ and a thickness of 3 mm. And, the solid vanadium salt or complex salt is supported on the surface of the conductive material by supporting method 2. The amount of the active material is $4.6 \times 10^{-4}$ mol, and the molar ratio between the active material on the positive electrode side and that on the negative electrode side is 1:1. Table 3 shows the energy efficiency and energy density of the solid vanadium redox rechargeable battery 100 adopting two different types of carbon felt obtained when it was operated at the current density of 5 mA/cm$^2$ and cutoff voltage of 0.7 V.

TABLE 3

| Carbon paper | Additional property | Thickness (mm) | Energy efficiency (%) | Energy efficiency (Wh/kg$^{-1}$) |
|---|---|---|---|---|
| XF20S | — | 2.9 | 85 | 41.4 ± 1.4 |
| XF20S | | 3.3 | 89 | 40.0 ± 3.1 |
| XF238 | High conductivity | 3.5 | 89 | 44.5 ± 1.1 |
| XF30A | | 4.2 | 82 | 51.3 ± 1.5 |
| XF30ADP14 | High conductivity + high flow rate | 3.8 | 94 | 55.2 ± 0.8 |

Table 3 exhibits that the highest energy efficiency is obtained when the carbon felt commercially available by the product name of XF30ADP14 is used. This XF30ADP14 has both high electrical conductivity and high flow rate, and the carbon felt is not limited to XF30ADP14 provided that the high electrical conductivity and the high flow rate are ensured.

Figure 15:
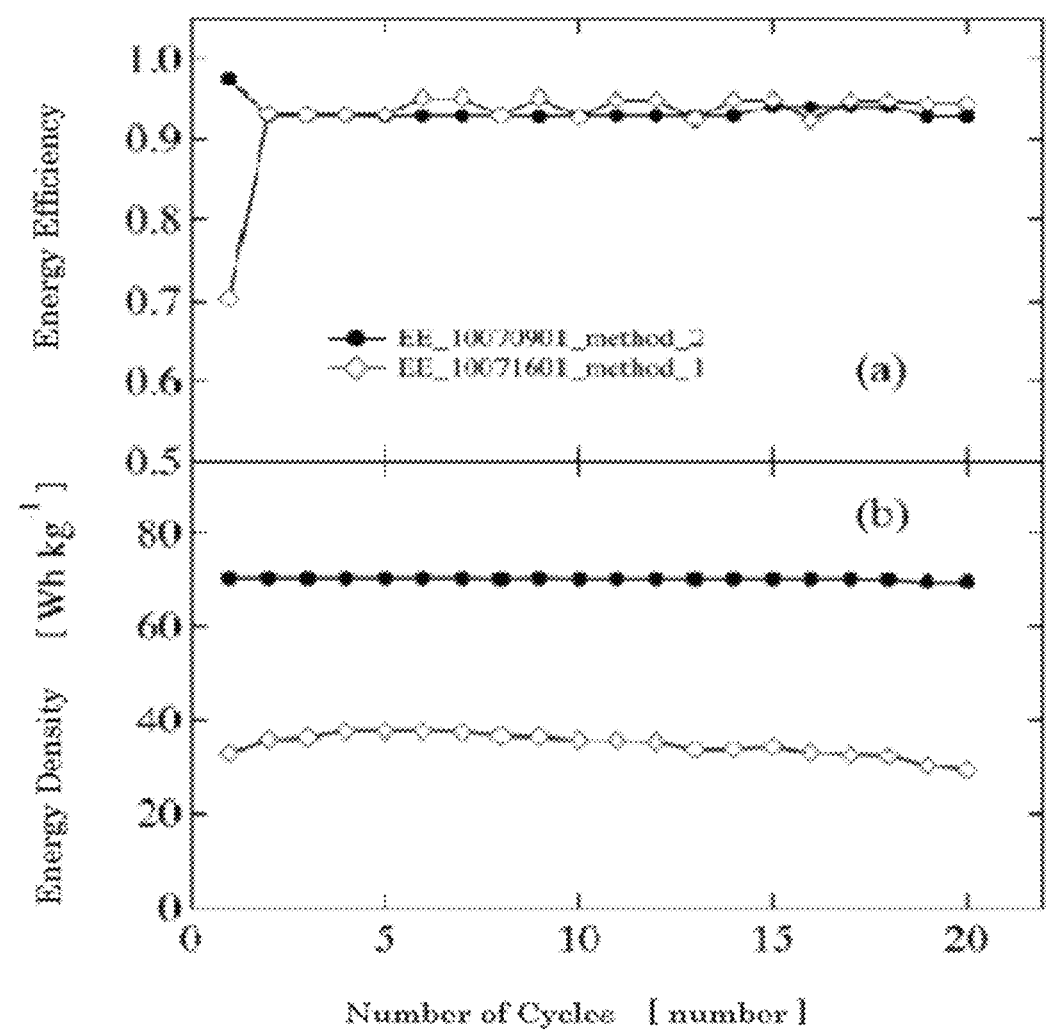
FIG. 15 is a chart showing the dependency of energy efficiency and energy density on the number of cycles of the solid vanadium redox rechargeable battery according to the present invention for supporting method 1 and supporting method 2 found when ion exchange membrane, carbon felt, namely the mixture of conductive material and active material, area, amount of active material, molar ratio between the active material on the positive electrode side and that on the negative electrode side, and current density and depth profile (cutoff voltage) of the method of operation are fixed.

FIG. 15 is a chart showing the energy efficiency and the energy density of the solid vanadium redox rechargeable battery according to the present invention on the number of cycles for supporting method 1 and supporting method 2 obtained when the ion exchange membrane, a carbon felt, namely the mixture of conductive material and active material, an area, an amount of active material, a molar ratio between the active material on the positive electrode side and that on the negative electrode side, and the current density and depth profile (cutoff voltage) of the method of operation are fixed. Specifically, the energy efficiency and the energy density of the solid vanadium redox rechargeable battery 100 adopting either supporting method 1 or supporting method 2 as the method of supporting two different types of solid vanadium salts or complex salts on the surface of the conductive material obtained when the ion exchange membrane commercially available by the product name of Neosepta (registered trademark) CMX C-1000 and the 3.8 mm-thick carbon felt commercially available by the product name of XF30ADP14, namely the mixture (chemical compound) of the conductive material and the active material, were packed in a cylindrical cell having the base area of 2.35 cm$^2$. The amount of active material was $4.6 \times 10^{-4}$ mol. And, the molar ratio of the active material between the positive electrode side and that on the negative electrode side was 1:1 are shown.

In FIG. 15, the black dots plot the charging and discharging characteristics in the first 96 cycles obtained when supporting method 1 was used as the method of supporting the active material on the conductive material of the rechargeable battery 100. The white diamonds in FIG. 15 plot the charging and discharging characteristics in the first 96 cycles obtained when supporting method 2 was used as the method of supporting the active material on the conductive material of the rechargeable battery 100. It is apparent that the energy density is favorably high when supporting method 2 is used.

The following Table 4 lists the energy efficiency of the solid vanadium redox rechargeable battery according to the present invention obtained when the ion exchange membrane, the carbon felt, the supporting method, the amount of active material, the molar ratio between the active material on the active electrode side and that on the negative electrode side, and the current density and the depth profile (cutoff voltage) of the method of operation were fixed, and the area of the mixture of conductive material and active material was changed. Specifically, Table 4 lists the ion exchange membrane commercially available by the product name of Neosepta (registered trademark) CMX C-1000, 3.8 mm-thick carbon felt commercially available by the product name of XF30ADP14, and solid vanadium salt or complex salt were supported on the surface of the conductive material by supporting method 2, the amount of active material was $4.6 \times 10^{-4}$ mol, and the molar ratio between the active material on the positive electrode side and that on the negative electrode side was 1:1. Table 4 shows the energy efficiency and the energy density of the solid vanadium redox rechargeable battery 100 adopting three different structures as the cell filled with the mixture (chemical compound) of conductive material and active material obtained when it was operated at the current density of 5 mA/cm$^2$ and cutoff voltage of 0.7 V.

TABLE 4

| Type of cell structure | Thickness (mm) | Area (cm$^2$) | Energy efficiency (%) | Energy efficiency (Wh/kg$^{-1}$) |
|---|---|---|---|---|
| A | 3 | 2.35 | 93 | 70 |
| B | 1.5 | 2.35 | 90 | 38 |
| C | 3 | 1.17 | 92 | 65 |

Cell structure type A has the base area of 2.35 cm$^2$ and thickness of 3 mm, and cell structure type B has the thickness of 1.5 mm, half the thickness of cell structure type A, even though it has the same base area as cell structure type A, namely 2.35 cm$^2$. Cell structure type C has the same thickness as cell structure type A, but its base area is 1.17 cm$^2$, half of the base area of cell structure type A.

It is apparent that cell structure type A achieves the highest energy efficiency of cell structure types A to C. The electrode area of cell structure type A is 2.35 cm$^2$, and thickness is 3 mm.

Figure 16:
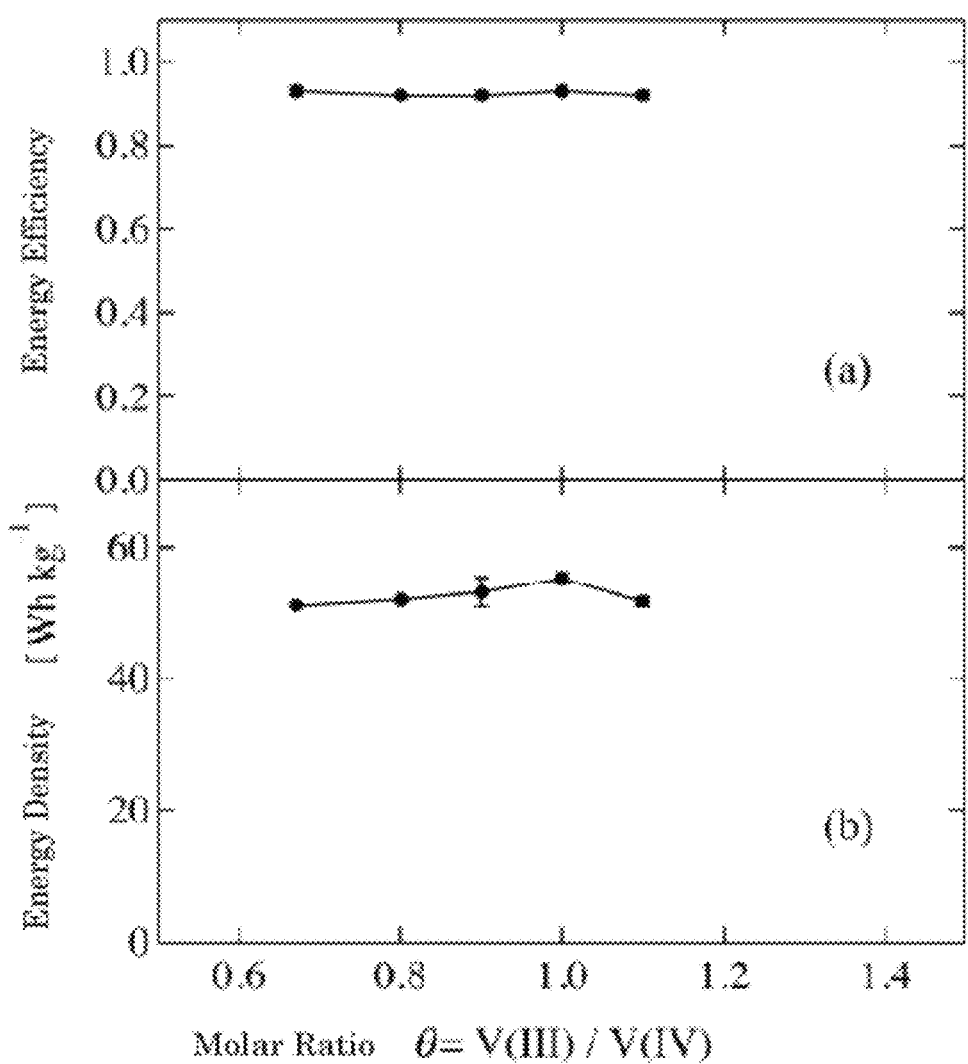
FIG. 16 is a chart showing the change in energy efficiency and energy density of the solid vanadium redox rechargeable battery found when ion exchange membrane, carbon felt, namely a mixture of conductive material and active material, area, supporting method, amount of active material, and current density and depth profile (cutoff voltage) of the method of operation are fixed, and the molar ratio between the active material on the positive electrode side and that on the negative electrode side is changed.

FIG. 16 is a chart showing the change in the energy efficiency and the energy density of the solid vanadium redox rechargeable battery according to the present invention obtained when the ion exchange membrane, carbon felt, namely the mixture of conductive material and active material, the area, the supporting method, amount of active material, and the current density and the depth profile (cutoff voltage) of the operation method were fixed, and the molar ratio between the active material on the positive material side and that on the negative electrode side was changed. Specifically, the ion exchange membrane commercially available by the product name of Neosepta (registered trademark) CMX C-1000 and the mixture (chemical compound) of conductive material and active material, namely 3.8 mm-thick carbon felt commercially available by the product name of XF30ADP14 are packed in a cylindrical cell having the base area of 2.35 cm$^2$ and thickness of 3 mm. And, the solid vanadium salt or complex salt is supported on the surface of the conductive material by supporting method 2. The amount of active material includes $4.6 \times 10^{-4}$ mol. FIG. 16 exhibits the change in the energy efficiency and the energy density of the solid vanadium redox rechargeable battery 100 adopting the molar ratio between active material on the active electrode side and that on the negative electrode side obtained when it was operated at the current density of 5 mA/cm$^2$ and the cutoff voltage of 0.7 V.

FIG. 16 exhibits that the energy efficiency per unit weight is the highest when the molar ratio between the active material on the positive electrode side and that on the negative electrode side is 1:1. However, it is also apparent that the energy efficiency does not depend largely on the molar ratio between the active material on the positive electrode side and that on the negative electrode side. This indicates that the solid vanadium redox rechargeable battery according to the present invention provides stable performance without fine-adjusting the molar ratio between the active material on the positive electrode side and that on the negative electrode side.

Figure 17:
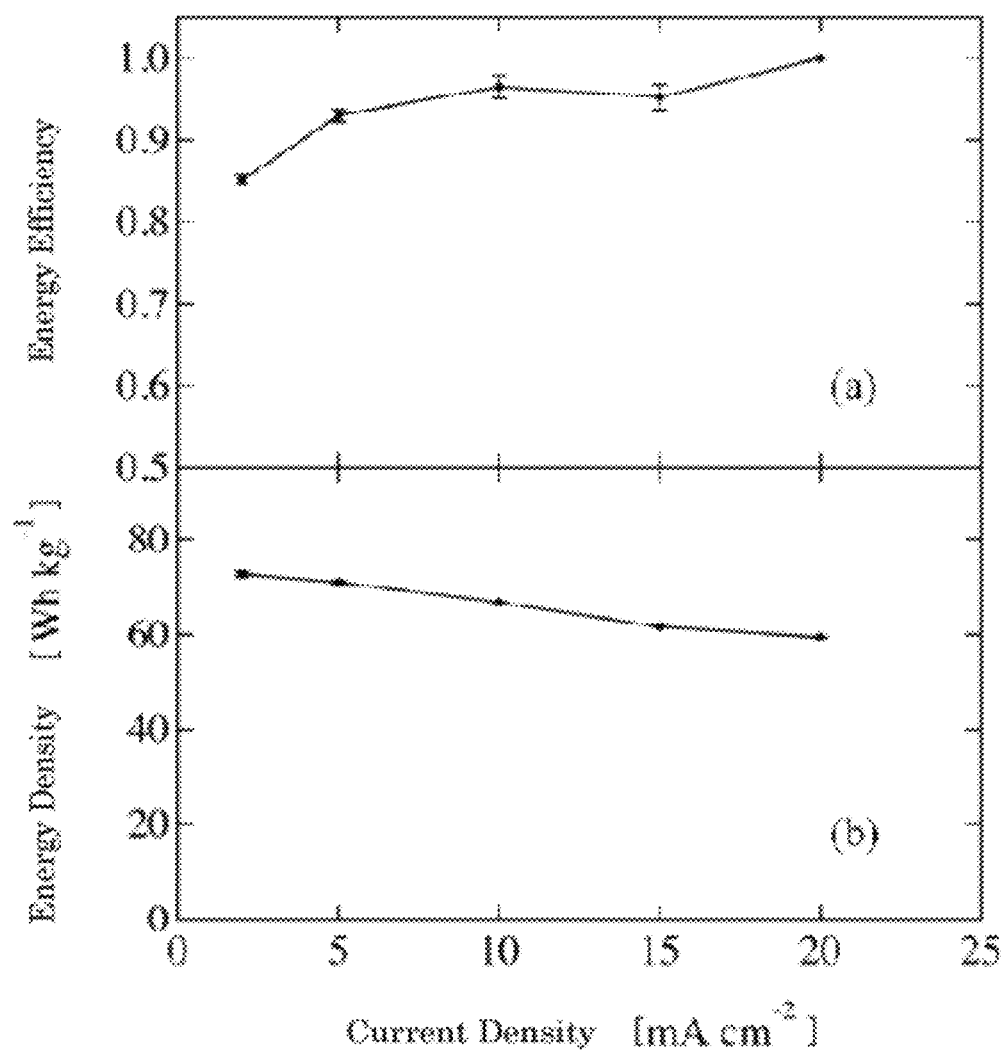
FIG. 17 is a chart showing the change in energy efficiency and energy density of the solid vanadium redox rechargeable battery according to the present invention found when ion exchange membrane, carbon felt, namely a mixture of conductive material and active material, area, supporting method, amount of active material, molar ratio of active materials, and depth profile (cutoff voltage) of the method of operation are fixed, and current density is changed.

FIG. 17 is a chart showing the change in the energy efficiency and the energy density of the solid vanadium redox rechargeable battery according to the present invention obtained when the ion exchange membrane, carbon felt, namely the mixture of conductive material and activated material, the area, the supporting method, the amount of active material, the molar ratio between activated materials, and the depth profile (cutoff voltage) of the operation method were fixed, and the current density was changed. Specifically, the ion exchange membrane commercially available by the product name of Neosepta (registered trademark) CMX C-1000 and the mixture (chemical compound) of conductive material and active material, namely 3.8 mm-thick carbon felt commercially available by the product name of XF30ADP14 are packed in a cylindrical cell having the base area of 2.35 cm$^2$ and thickness of 3 mm. The solid vanadium salt or complex salt is supported on the surface of the conductive material by supporting method 2, and the amount of active material includes $4.6 \times 10^{-4}$ mol. FIG. 17 exhibits the change in the energy efficiency and energy density of the solid vanadium redox rechargeable battery 100 whose molar ratio between the active material on the active electrode side and that on the negative electrode side is 1:1 obtained when it was operated by four different current densities and the cutoff voltage of 0.7 V.

FIG. 17 shows the calculated average energy density in the first to the fifth charging and discharging cycles for each of the cases where the current density was 2, 5, 10, 15, and 20 mA/cm$^2$.

FIG. 17 exhibits that the high energy efficiency is ensured when the current density is larger than 5 mA/cm$^2$.

Figure 18:
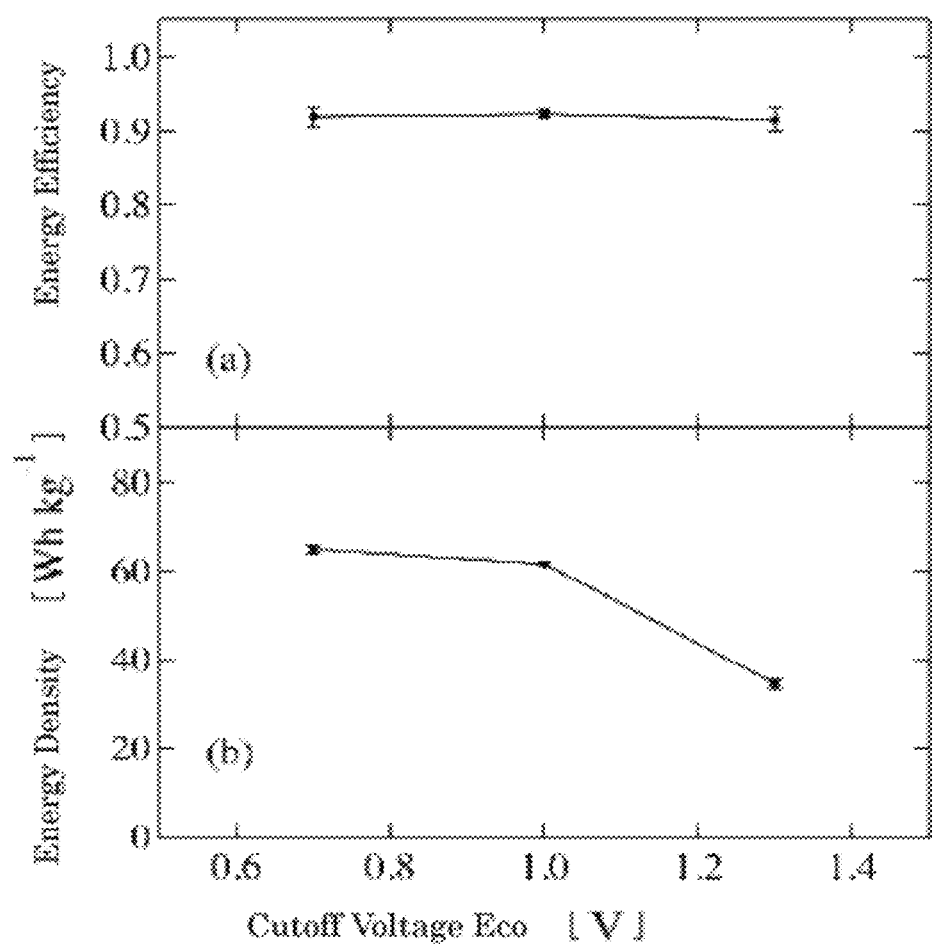
FIG. 18 is a chart showing the change in energy efficiency and energy density of the solid vanadium redox rechargeable battery according to the present invention found when ion exchange membrane, carbon felt, namely a mixture of conductive material and active material, area, supporting method, amount of active material, molar ratio between the active material on the positive electrode side and that on the negative electrode side, and current density of the method of operation are fixed, and the depth profile (cutoff voltage) is changed.

FIG. 18 is a chart showing the change in the energy efficiency and the energy density of the solid vanadium redox rechargeable battery according to the present invention obtained when the ion exchange membrane, carbon felt, namely the mixture of conductive material and active material, area, supporting method, the amount of active material, the molar ratio between the active material on the positive electrode side and that on the negative electrode side, and the current density of the operation method were fixed, and the depth profile (cutoff voltage) was changed. Specifically, the ion exchange membrane commercially available by the product name of Neosepta (registered trademark) CMX C-1000 and a mixture (chemical compound) of conductive material and active material, namely 3.8 mm-thick carbon felt commercially available by the product name of XF30ADP14 are packed in a cylindrical cell having the base area of 2.35 cm$^2$ and thickness of 3 mm. And, the solid vanadium salt or complex salt is supported on the surface of the conductive material by supporting method 2. The amount of active material includes 4.6×10$^{-4}$ mol. FIG. 18 exhibits the energy efficiency and the energy density of the solid vanadium redox rechargeable battery 100 whose molar ratio between the active material on the positive electrode side and that on the negative electrode side is 1:1 obtained when it was operated at the current density of 5 mA/cm$^2$ and three different cutoff voltages, namely 1.3 V, 1.0 V, and 0.7 V.

In FIG. 18, the dependency of the energy efficiency values on the cutoff voltage values is small. However, the energy density value decreases with the decrease in cutoff voltage from 1.3 V through 1.0 V to 0.7 V.

Therefore, it was concluded that the cutoff voltage value of 0.7 V was desirable for the solid vanadium redox rechargeable battery according to the present invention.

In the above example, the counter ions were sulfate ions. However, instead of sulfate salt, chlorine ions/chloride ions, fluorine ions/fluoride ions, etc. can also be used.

Table 5 lists the theoretical energy density values obtained when sulfate salt, chloride, and fluoride are used as counter ions. The amount of active material was assumed to be 5 mol both for the positive electrode side and for the negative electrode side when counter ions were chlorine ions/chloride ions or fluorine ions/fluoride ions. The output voltage of the rechargeable battery was assumed to be 1.5 V. In these cases also, the solid vanadium redox rechargeable battery according to the present invention ensures the high energy density.

Since the solid vanadium redox rechargeable battery structured as shown above, which is very compact and has output voltage of 1.5 V and weight energy density of 70 Wh/kg, it can be used widely for Personal Conputors (PC), personal digital assistances (PDA), digital cameras, digital media players, digital recorders, game consoles, electric appliances, vehicles, wireless equipment, mobile phones, etc.

What is claimed is:

1. A vanadium redox rechargeable battery, comprising:
   a first vanadium mixture; and
   a second vanadium mixture,
   wherein the first vanadium mixture contains a surface that is composed of a negative electrode,
   the second vanadium mixture contains a surface that is composed of a positive electrode,
   the first vanadium mixture contains a solid first vanadium compound, whose oxidation number changes between 2 and 3 due to oxidation or reduction reactions,
   the second vanadium mixture contains a solid second vanadium compound, whose oxidation number changes between 5 and 4 due to reduction or oxidation reactions,
   the first vanadium compound is selected from any one of or combination of the following: salt or hydrate salt with sulfate, chloride, fluoride, or coordination compound of vanadium,
   the second vanadium compound is selected from any one of or combination of the following: salt or hydrate salt with sulfate, chloride, fluoride, or coordination compound of vanadium, and
   a conductive material,
   wherein at least one of the first vanadium mixture and the second vanadium mixture is supported, dried and solidified on a surface of the conductive material.

2. The vanadium redox rechargeable battery as set forth in claim 1, further comprising another negative electrode and another positive electrode.

3. The vanadium redox rechargeable battery as set forth in claim 1,
   wherein the first vanadium compound is selected from any one of vanadium(II) sulfate n-hydrate, or vanadium(III) sulfate n-hydrate, and
   the second vanadium compound is selected from any one of vanadyl(IV) sulfate n-hydrate, or vanadium(V) dioxysulfate n-hydrate.

4. The vanadium redox rechargeable battery as set forth in claim 3,
   wherein the first vanadium mixture and/or the second vanadium mixture comprises a sulfuric acid solution and/or silica.

5. The vanadium redox rechargeable battery as set forth in claim 1,
   wherein the first vanadium compound is selected from any one of vanadium(II) chloride n-hydrate, or vanadium(III) chloride n-hydrate, and

TABLE 5

| Counter Ion | Polarity | Active material Compound | n | FW/g (mol-V)$^{-1}$ | /10$^{-3}$gC$^{-1}$ | Energy density Compound [10$^{-3}$gC$^{-1}$] | [mAhg$^{-1}$] | (Whkg$^{-1}$) |
|---|---|---|---|---|---|---|---|---|
| Sulfate salt | − | V(SO4)$_{1.5}$•nH$_2$O | 8.15. ± 0.13 | 341.73 | 3.54 | 5.93 | 46.7 | 70.1 |
| | + | VOSO$_4$•nH$_2$O | 3.75 ± 0.13 | 230.5 | 2.39 | | | |
| Chloride | − | VCl$_{1.5}$•nH$_2$O | 5 | 194.115 | 2.01 | 4.37 | 63.3 | 95.0 |
| | + | VOCl$_2$•nH$_2$O | | 227.84 | 2.36 | | | |
| Fluoride | − | VF$_{1.5}$•nH$_2$O | 5 | 169.44 | 1.76 | 3.78 | 73.3 | 110.0 |
| | + | VOF$_2$•nH$_2$O | | 194.94 | 2.02 | | | | the second vanadium compound is selected from any one of vanadium(IV) oxychloride n-hydrate, or vanadium (V) dioxychloride n-hydrate.

6. The vanadium redox rechargeable battery as set forth in claim 5,
wherein the first vanadium mixture and/or the second vanadium mixture further comprises a hydrochloric acid solution and/or silica.

7. The vanadium redox rechargeable battery as set forth in claim 1,
wherein the first vanadium compound is selected from any one of vanadium(II) fluoride n-hydrate, or vanadium (III) fluoride n-hydrate, and
the second vanadium compound is selected from any one of vanadium (IV) oxyfluoride n-hydrate, or vanadium (V) dioxyfluoride n-hydrate.

8. The vanadium redox rechargeable battery as set forth in claim 7,
wherein the first vanadium mixture and/or the second vanadium mixture further comprises a hydrogen fluoride solution and/or silica.

9. The vanadium redox rechargeable battery as set forth in claim 1,
wherein the conductive material is same as a material that forms the negative electrode and the positive electrode, or the conductive material is a part of the negative electrode and the positive electrode.

10. The vanadium redox rechargeable battery as set forth in claim 1,
wherein the conductive material is carbon.

11. The vanadium redox rechargeable battery as set forth in claim 1,
wherein the conductive material is made of any one of carbon fiber, carbon felt, knitted carbon fabric, carbon texture or carbon paper.

12. The vanadium redox rechargeable battery as set forth in claim 1, further comprising a separator.

13. The vanadium redox rechargeable battery as set forth in claim 12,
wherein the separator is made of an ion exchange membrane.

14. The vanadium redox rechargeable battery as set forth in claim 1, provided with a stacked structure.

15. A method of manufacturing the vanadium rechargeable battery as set forth in claim 1, comprising:
preparing a solution containing a solvent and a first vanadium compound for forming a first vanadium mixture or a second vanadium compound for forming a second vanadium mixture;
immersing a conductive material in the solution; and
evaporating the solvent from the solution on the conductive material, thereby producing the vanadium rechargeable battery of claim 1 which comprises at least one of the first vanadium mixture and the second vanadium mixture which is supported on a surface of the conductive material in such a manner that said at least one of the first vanadium mixture and the second vanadium mixture has been dried and solidified on the conductive material.

16. The method as set forth in claim 15, comprising:
performing electrolytic reduction or electrolytic oxidation of a solution containing tetravalent vanadium ions or cations containing vanadium in tetravalent state to obtain the solution in the preparation step as set forth in claim 15.

17. The method as set forth in claim 16, comprising:
performing electrolytic reduction of a solution containing a solvent and tetravalent vanadium ions or cations containing vanadium in tetravalent state, placing the solution in gas including oxygen before evaporating the solvent to obtain the first vanadium mixture.

18. The method as set forth in claim 16, comprising:
extracting supernatant and precipitations from the solution in the electrolytic oxidation step, and evaporating the solvent from the supernatant and precipitations to obtain the second mixture in the evaporation step.

* * * * *